US011017002B2

(12) United States Patent
Liu et al.

(10) Patent No.: US 11,017,002 B2
(45) Date of Patent: May 25, 2021

(54) DESCRIPTION MATCHING FOR APPLICATION PROGRAM INTERFACE MASHUP GENERATION

(71) Applicant: FUJITSU LIMITED, Kawasaki (JP)

(72) Inventors: Lei Liu, San Jose, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 148 days.

(21) Appl. No.: 16/009,123

(22) Filed: Jun. 14, 2018

(65) Prior Publication Data

US 2019/0384856 A1 Dec. 19, 2019

(51) Int. Cl.
*G06F 16/33* (2019.01)
*G06F 9/54* (2006.01)
*G06F 16/36* (2019.01)
*G06F 40/226* (2020.01)
*G06F 40/295* (2020.01)

(52) U.S. Cl.
CPC ............ *G06F 16/3334* (2019.01); *G06F 9/54* (2013.01); *G06F 16/36* (2019.01); *G06F 40/226* (2020.01); *G06F 40/295* (2020.01)

(58) Field of Classification Search
CPC .... G06F 16/3334; G06F 16/36; G06F 40/295; G06F 40/226; G06F 9/54
See application file for complete search history.

(56) References Cited

U.S. PATENT DOCUMENTS

| | | | |
|---|---|---|---|
| 2009/0235285 A1* | 9/2009 | Kim | G06F 16/9027 719/328 |
| 2010/0211580 A1* | 8/2010 | Sreekanth | G06F 8/10 707/756 |
| 2011/0099159 A1* | 4/2011 | Trevor | G06F 16/958 707/709 |
| 2011/0153590 A1* | 6/2011 | Chang | G06F 16/958 707/711 |
| 2012/0096429 A1* | 4/2012 | Desai | G06F 8/34 717/107 |
| 2017/0277756 A1* | 9/2017 | Masuda | G06F 9/5072 |

(Continued)

OTHER PUBLICATIONS

U.S. Appl No. 15/641,196, filed Jul. 3, 2017.

(Continued)

*Primary Examiner* — Matthew J Ellis
(74) *Attorney, Agent, or Firm* — Maschoff Brennan

(57) ABSTRACT

A method of determining application program interface (API) mashups is provided. The method may include identifying an endpoint description for a first API, and determining whether the endpoint description includes at least one of input description data and output description data. Further, the method may include, in response to the endpoint description including the input description data, determining at least one possible API mashup including the first API and a second API based on a comparison of the input description data and an output description of the second API. Moreover, the method may include, in response to the endpoint description including the output description data, determining one or more possible API mashups including the first API and the second API based on a comparison of the output description data and an input description of the second API.

20 Claims, 16 Drawing Sheets

(56) References Cited

U.S. PATENT DOCUMENTS

2019/0188056 A1* 6/2019 Dimascio ............ G10L 15/1815
2019/0362003 A1* 11/2019 Zhang ................. G06F 16/2423

OTHER PUBLICATIONS

U.S. Appl. No. 15/374,798, filed Dec. 9, 2016.
U.S. Appl. No. 15/727,540, filed Oct. 6, 2017.
Xu et al., "How to Write a Spelling Corrector" Feb. 2007, Retrieved From: http://norvig.com/spell-correct.html.
"Spelling", Computational Linguistics and Psycholinguistics Research Center, Feb. 2018, Retrieved From: http://www.clips.ua.ac.be/pages/pattern-en#spelling.

* cited by examiner

FIG. 7B

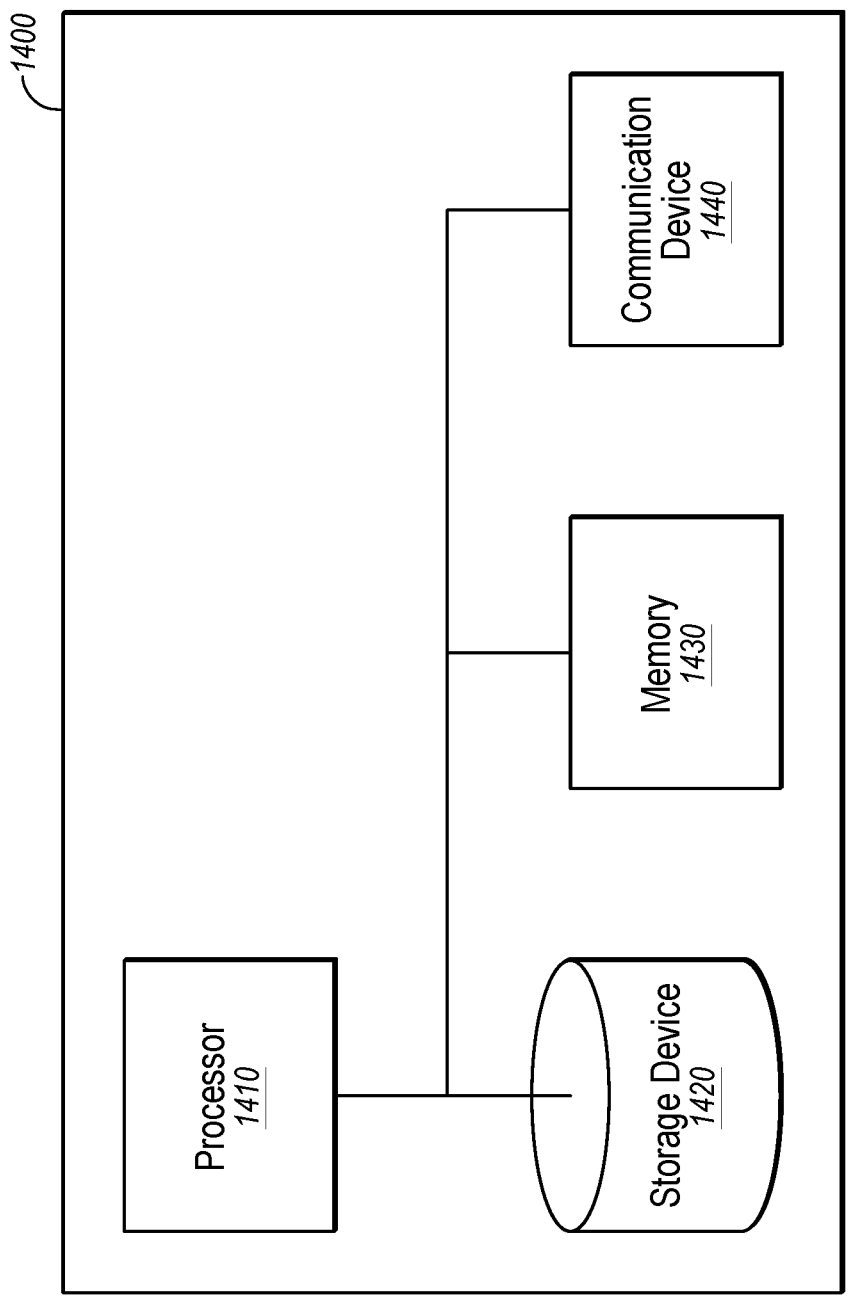

DESCRIPTION MATCHING FOR APPLICATION PROGRAM INTERFACE MASHUP GENERATION

FIELD

The embodiments discussed herein relate to description matching for application program interface (API) mashup generation.

BACKGROUND

An application programming interface (API) is a set of protocols, commands, definitions, and tools for creating application software. An API may specify how software components should interact and how APIs are used when programming graphical user interface (GUI) components or implementing services or functions. An API mashup is a plurality of APIs functioning together in order to provide new or value-added services.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include identifying an endpoint description for a first API, and determining whether the endpoint description includes at least one of input description data and output description data. Further, the method may include, in response to the endpoint description including the input description data, determining at least one possible API mashup including the first API and a second API based on a comparison of the input description data and an output description of the second API. Moreover, the method may include, in response to the endpoint description including the output description data, determining one or more possible API mashups including the first API and the second API based on a comparison of the output description data and an input description of the second API.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 7B depicts another example API including an endpoint, an input description, an output description, and an endpoint description;

FIG. 14 is a block diagram of an example computing system.

DESCRIPTION OF EMBODIMENTS

Various embodiments disclosed herein relate to application program interface (API) mashup generation. More specifically, some embodiments may relate to processing (e.g., filtering, recommending, ranking, and/or identifying plausible API mashups) to generate refined (e.g., prioritized) API mashups. More specifically, various embodiments relate to input/output matching for generating API mashups. Moreover, various embodiments may relate to processing, validating and/or filtering API descriptions (e.g., input descriptions, output descriptions, endpoint descriptions, etc.) (e.g., for matching purposes).

According to some embodiments, a matching-based method is provided. More specifically, for example, if a first API's output description is similar to second API's input description, the first and second API is likely a plausible mashup. In other embodiments, a replacement-based method is provided. More specifically, for example, if a first API's input/output description is similar to a second API's input/output description, and if the first API and a third API is a plausible mashup, then it is likely that the second API and the third API is a plausible mashup.

Further, refined API mashups may be provided to one or more application developers. More specifically, in some embodiments, identified (e.g., generated) API mashups may be, for example, filtered, tested, and/or ranked, such that one or more most suitable API mashups may recommended (e.g., with high priority). Some embodiments may include online processing to facilitate the prediction of whether or not several APIs can be used for a plausible API mashup and/or whether or not APIs may be introduced to enhance performance.

Conventionally, due to the huge number of available APIs, identifying suitable APIs to use in an application was burdensome and may have required manual and time-consuming searches across a diverse set of websites. Furthermore, information was primarily limited to a single API. Therefore, to develop an application by utilizing multiple APIs, developers need to search and select APIs, understand each API by reviewing documentation, and verify inputs and outputs to determine whether these APIs may be combined as an API mashup.

Embodiments of the present disclosure will be explained with reference to the accompanying drawings.

Figure 1:
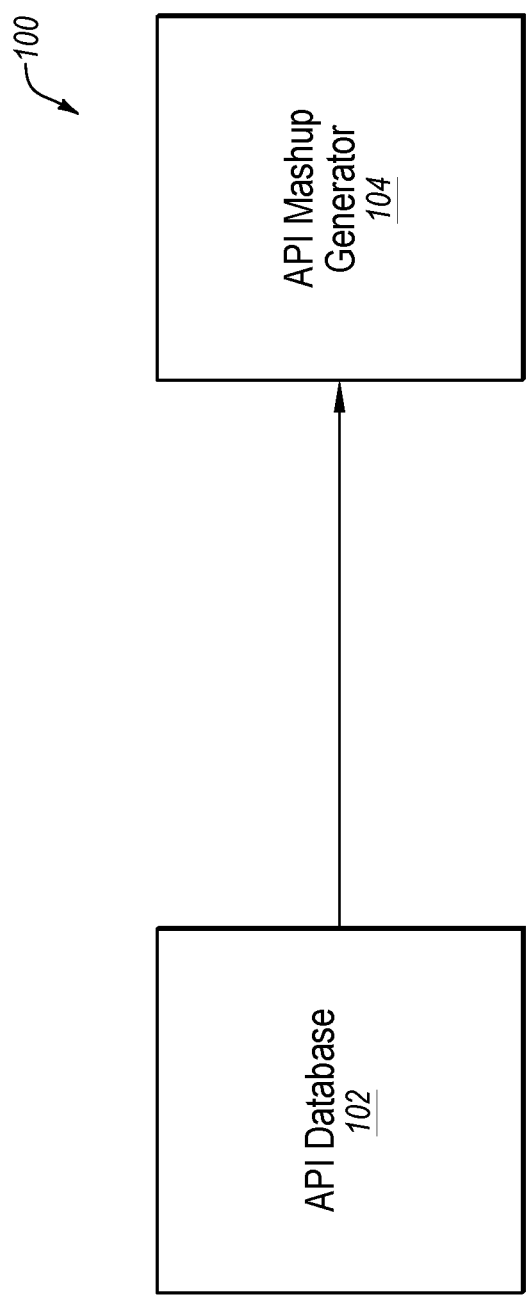
FIG. 1 a block diagram of an example system including an API mashup generator.

FIG. 1 is a block diagram of an example API mashup generation system 100 including an API database 102 and an API mashup generator 104. API database 102 may include a plurality of APIs (e.g., API1-APIn) and, in some embodiments, various API data, such as API endpoints, parameters, and their descriptions. API database 102 may include any computer-based source for APIs and/or API data. For example, API database 102 may include a server, client computer, repository, etc. API database 102 may store APIs and API data in any electronic format. Further, the API data may be machine-readable and/or human readable. The API data may be in any language. For example, the API data may be in any target human language (e.g., English, Japanese, German, etc.). The API may be in any structured data format. For example, the API data may be in Open API specification, JavaScript Object Notation (JSON), Extensible Markup Language (XML), etc.

Each API of API database 102 may be associated with primary-category keywords (e.g., medical), second-category keywords (e.g., healthcare, business, office, etc.), an API description, and other information related to APIs (e.g. endpoints, HTTP methods, parameters, and their descriptions). In some embodiments, API category keywords (e.g., primary and secondary category keywords) and/or API descriptions may be defined by a repository (e.g., a public repository, such as the ProgrammableWeb™).

API mashup generator 104 may be configured to receive APIs and/or API data from API database 102 and generate one or more API mashups, according to one or more embodiments as described herein. Further, according to some embodiments, API mashup generator 104 may process the one or more API mashups to generate one or more refined API mashups.

For example, mashup generation may involve and/or may be based on methods described in U.S. application Ser. No. 15/641,196, which is hereby incorporated by reference in its entirety. Further, generating, filtering, recommending and/or learning API mashups may involve and/or may be based on methods described in U.S. application Ser. No. 15/727,540, which is hereby incorporated by reference in its entirety.

Figure 2:
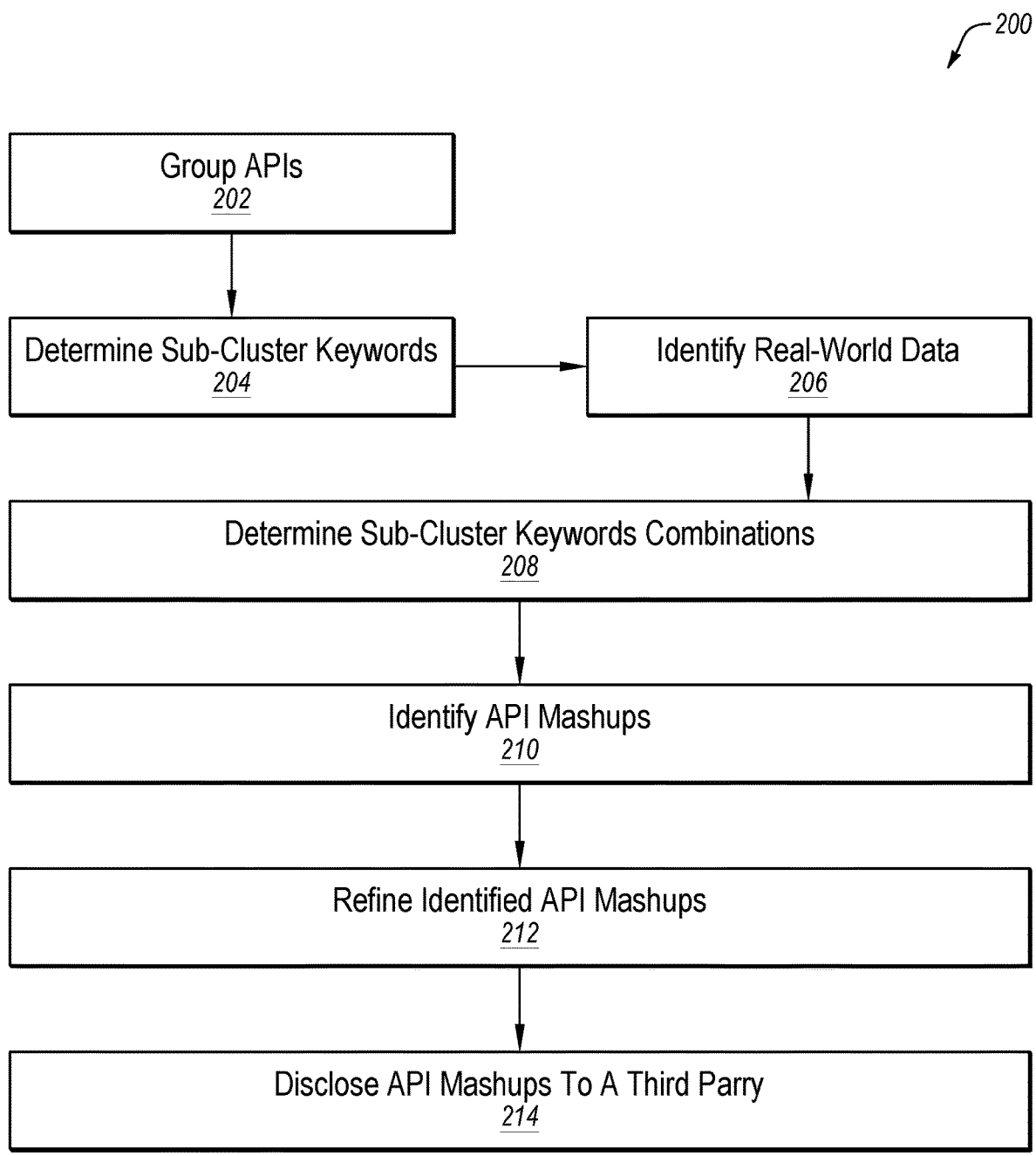
FIG. 2 shows an flow diagram of an example method of generating one or more API mashups.

FIG. 2 shows an example flow diagram of a method 200 of generating one or more API mashups, arranged in accordance with at least one embodiment described herein. Although illustrated as discrete blocks, various blocks may be divided into additional blocks, combined into fewer blocks, or eliminated, depending on the desired implementation.

In some embodiments, method 200 may be performed by one or more devices, such as system 100 of FIG. 1 and/or system 1400 of FIG. 14. For instance, processor 1410 of FIG. 14 may be configured to execute computer instructions stored on memory 1430 to perform functions and operations as represented by one or more of the blocks of method 200.

Method 200 may begin at block 202. At block 202, a plurality of APIs may be grouped. In some embodiments, the plurality of APIs may be grouped into categories, clusters, and/or sub-clusters. For example, the APIs, which may be received from a database (e.g., API database 102 of FIG. 1) and/or a various sources (e.g., websites) may be grouped, via at least one processor (e.g., processor 1410 of FIG. 14), according to an API tree structure (e.g., category, cluster, and sub-cluster, or more layers/levels). More specifically, for example, categories for API be generated via determining a frequency of every keyword in both category and primary-category fields of the APIs, ranking and selecting the keywords based on their frequency (e.g., machine classification), and selecting top keywords (e.g., M keywords) as categories for the API.

Further, clusters for APIs in each category may be generated. In some embodiments, text mining and/or natural language processing (NLP) techniques may be used to analyze the secondary category keywords. For example, "stop" and/or general words may be removed, a word stemming operation may be performed, keywords may be counted and ranked based on frequency, and top keywords (e.g., N keywords) may be selected as clusters.

Moreover, sub-clusters for APIs in each cluster may be generated. In some embodiments, via text mining and/or NLP tools and/or techniques, descriptions of the APIs may be analyzed, similarity scores among refined keywords may be measured, and the top keywords (e.g., K keywords) may be selected as sub-clusters. More specifically, in some embodiments, the APIs may be grouped into different sub-clusters based on their categories and descriptions via, for example, text mining and NLP tools and/or techniques. For example, "stop" words and symbols may be removed, keyword types (e.g., noun, verb, etc.) may be determined, a word stemming operation may be performed, keywords may be counted and ranked based on frequency, similarity scores (e.g., using NLP techniques) among the keywords may be measured, and the top keywords (e.g., K keywords) may be selected as sub-clusters. Keyword similarity may be evaluated via any suitable metric (e.g., Levenshtein Distance, Euclidean Distance, Hamming Distance, Simhash, Minhash, Locality-sensitive Hashing (LSH), etc.).

In some embodiments, wherein real-world data is available (e.g., from one or more corresponding websites for each category), sub-cluster keyword combinations may be identified via, for example, named entity recognition and may be based on the sub-cluster keywords and the real-world data when the real-world data is available from one or more corresponding websites for each category.

In other embodiments, wherein real-world data may be unavailable, sub-cluster keyword combinations may be identified via identifying all possible sub-cluster keyword combinations of sub-cluster keywords and/or identifying sub-cluster keyword combination having sub-cluster keywords with a description frequency above a threshold (e.g., 5 occurrences, 10 occurrences, 20 occurrences, etc.).

At block 204, a plurality of sub-cluster keywords may be determined, and method 200 may proceed to block 206. More specifically, for example, the plurality of APIs may be grouped, via at least one processor (e.g., processor 1410 of FIG. 14), into a plurality of sub-clusters based on at least one keyword for each of the plurality of APIs. Although method 200 is illustrated as proceeding from block 204 to block 206, the operation of block 206 may be independent of the operation of block 204. For example, block 204 may proceed to block 208.

Figure 3:
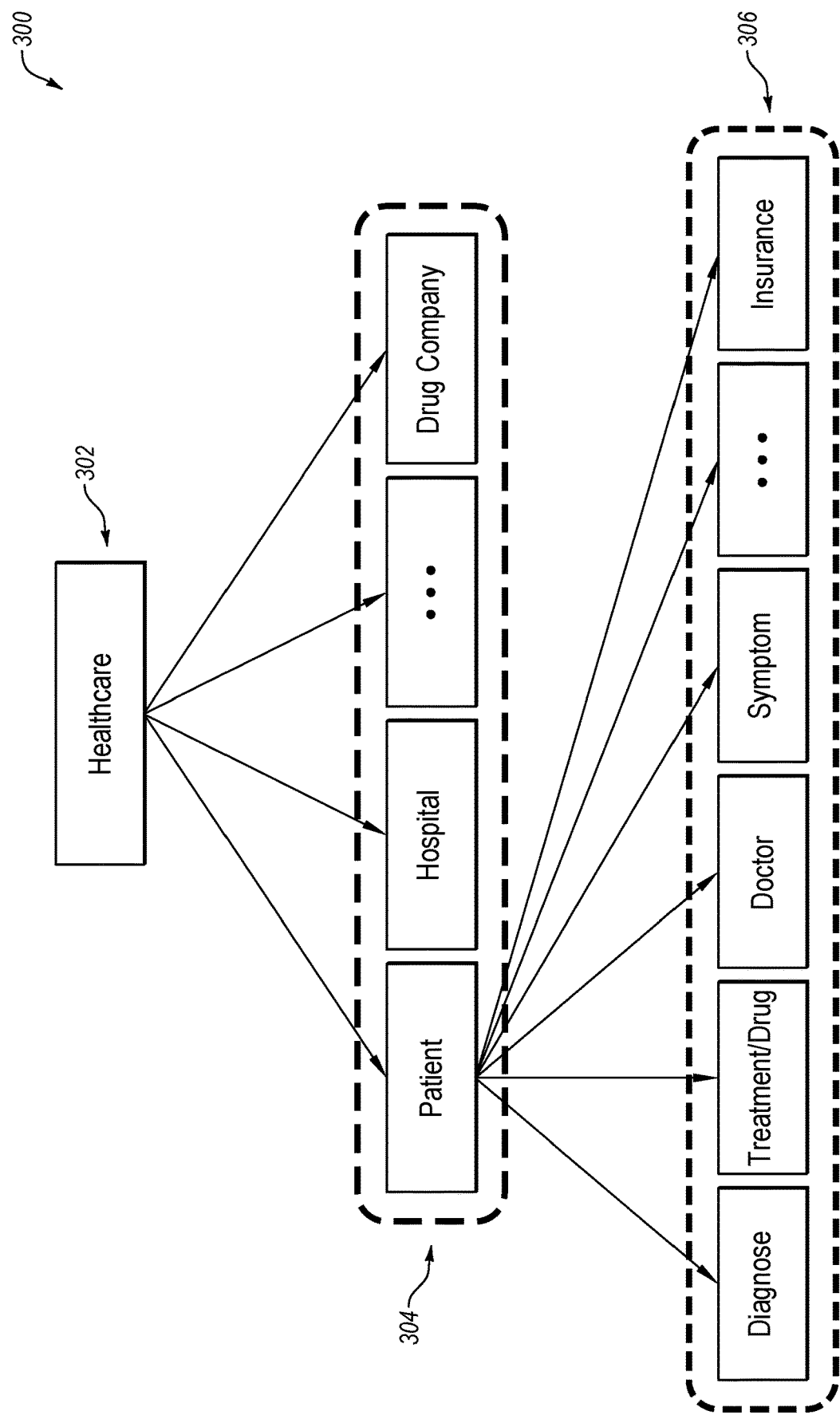
FIG. 3 illustrates an example API tree structure.

With reference to an example tree structure 300 illustrated in FIG. 3, a first level (e.g., a top level) 302 may include a category and/or primary-category keywords, a second level 304 may include secondary-category keywords, and a third level 306 may include keywords (e.g., determined via API descriptions). Third level 306 may include a plurality of sub-clusters, wherein each sub-cluster includes a keyword and one or more (e.g., several) APIs.

Although tree structure 300 is related to a healthcare domain, the present disclosure is not so limited. Rather, the embodiments described herein may be applicable to any domain, such as science, finance, business, education, e-commerce, etc.

Figure 4:
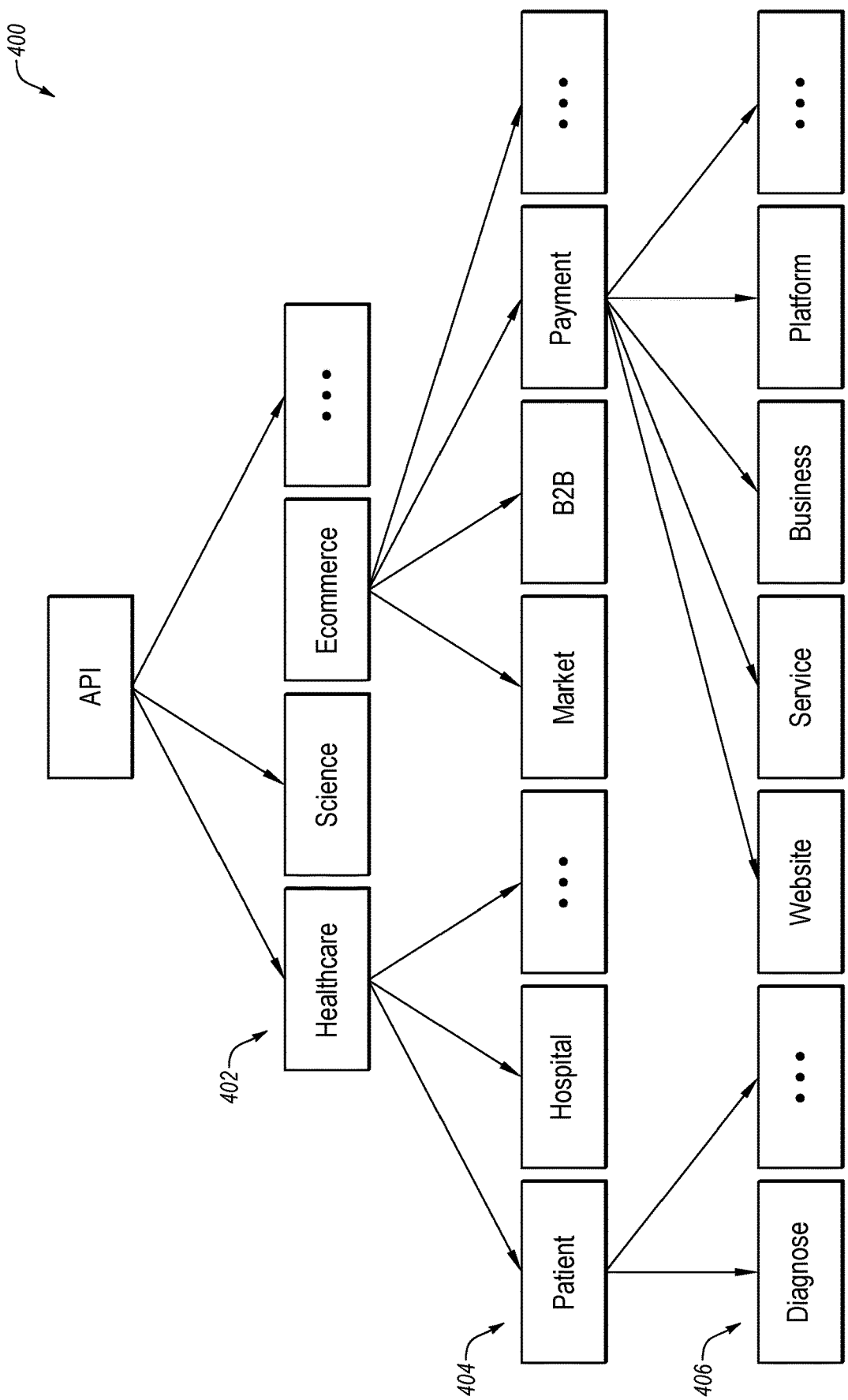
FIG. 4 illustrates another example API tree structure.

FIG. 4 illustrates another example tree structure 400. Structure 400 includes a first level (e.g., top level) 402 including categories and/or primary-category keywords, a second level 404 including secondary-category keywords, and a third level 406 including keywords (e.g., determined via API descriptions). Third level 406 may include a plurality of sub-clusters, wherein each sub-cluster includes a keyword and one or more (e.g., several) APIs. In some embodiments, an API (e.g., authentication API), based on its keywords and description, may be grouped into multiple sub-clusters (e.g., in different domains).

With reference again to method 200 in FIG. 2, at block 206, real-world data (e.g., real-world questions) may be identified, and method 200 may proceed to block 208. For example, real-world data, which may include real-world questions, may be gathered via at least one processor (e.g., processor 1410 of FIG. 14) (e.g., from the Internet via web crawlers). For example, for a healthcare specific domain, patient questions may be extracted from websites, such as professional healthcare related websites. In other example, for other domains, related information may be identified (e.g., via related web blogs) and web crawlers may be used to extract the relevant information. For example, in a finance related domain, data (e.g., questions) may be collected from one or more financial investment blogs (e.g. a Vanguard™ blog).

Figure 5:
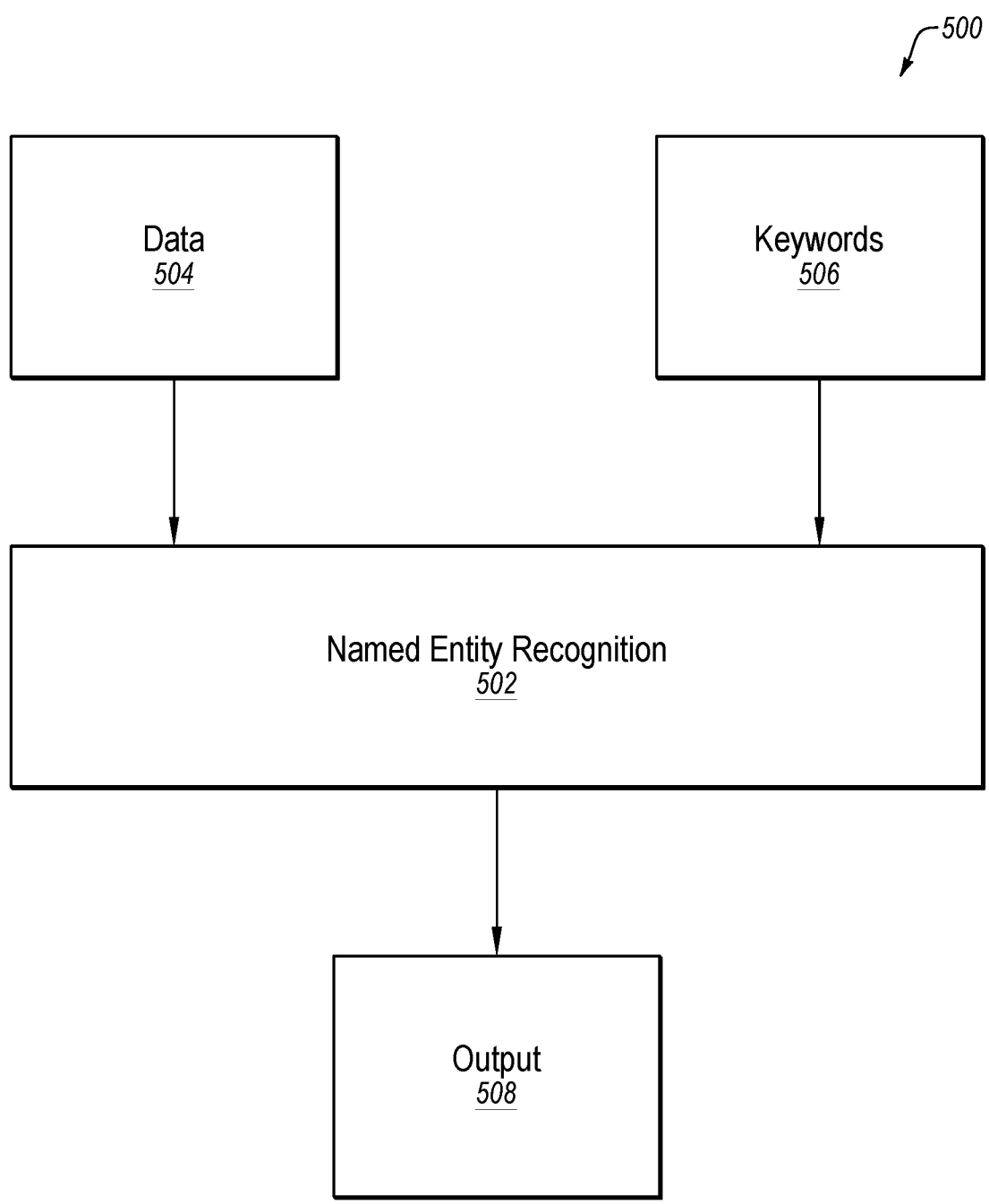
FIG. 5 depicts an example system including a named entity recognition tool.

At block 208, based on the identified data (e.g., real-world data) and the sub-cluster keywords, sub-cluster keyword combinations may be determined, and method 200 may proceed to block 210. As an example, at least one processor (e.g., processor 1410 of FIG. 14) may be used for determining keyword combinations. Further, for example, useful sub-cluster combinations may be determined via named entity recognition techniques. For example, as illustrated in an example system 500 of FIG. 5, a named entity recognition tool 502 may receive data (e.g., real-world data, such as real-world questions) 504 and sub-cluster keywords 506, and generate an output 508 including a list of sub-cluster keyword combinations.

In some embodiments, keyword combination frequencies may be used to determine the popularity of sub-cluster keyword combinations. For example, at least one processor (e.g., processor 1410 of FIG. 14) may be used for determining keyword combination frequencies. For example, approximately 50,000 clinical questions may be processed, and approximately 10,000 sub-cluster keyword combinations may be generated based on the clinical questions. In some embodiments, a keyword combination frequency may incremented when a collected question matches all the keywords for a given combination.

Based on sub-cluster keyword combinations and APIs in each sub-cluster, one or more possible API mashups including two or more APIs of the plurality of APIs may be determined (e.g., via at least one processor (e.g., processor 1410 of FIG. 14)).

At block 210, API mashups may be identified, and method 200 may proceed to block 212. For example, the API mashups may be identified via at least one processor (e.g., processor 1410 of FIG. 14). More specifically, for a given sub-cluster keyword combination, by selecting an API from each sub-cluster, all possible API mashups can be identified. Further, a similarity analysis for each identified possible API mashup may be performed to identify, and possibly rank, API mashups.

For each API in an API mashup, a description may be known. An API description may include a compressive summary for the given API, which may include, but is not limited to, API title and keywords, input/output parameters, API introduction, protocol formats, endpoint descriptions, input/output descriptions, etc. Each part of a description may be obtained and assembled from one or multiple sources (e.g. API related websites). Further, in some embodiments, a word vector for each description may be generated and an average value of a similarity score may be measured. The similarity analysis may be keyword-based, sentence-based, or both. For example, the similarity analysis may be performed via at least one processor (e.g., processor 1410 of FIG. 14).

More specifically, in some embodiments, similarity analysis measurements may be based on descriptions of APIs. More specifically, the descriptions of each API in an API mashup may be separated into sentences, "stop" words and symbols may be removed, a word stemming operation may be performed, and NLP techniques may be used to convert each sentence into a word vector. Further, a hamming distance, for example, or other similarity metrics, among word vectors, may be computed. As one example, an average similarity score may be equal to sum(hamming distances)/total number of computations.

As an example, assuming the description of an API ("API1") includes two sentences (e.g., API1_s1 and API1_s2), and the description of another API ("API2") includes three sentences (e.g., API2_s1, API2_s2, and API2_s3), the hamming distance between every two sentences (Ham(API1_s1, API2_s1)) may be computed, and the similarity score may be equal to (Ham(API1_s1, API2_s1)+Ham(API1_s1, API2_s2)+Ham(API1_s1, API2_s3)+Ham(API1_s2, API2_s1)+Ham(API1_s2, API2_s2)+Ham(API1_s2, API2_s3))/6.

At block 212, the identified API mashups may be refined, and method 200 may proceed to block 214. For example, after API mashups are identified and/or generated based on API description similarity analysis, the results may be filtered to refine and/or rank the identified API mashups (e.g., via at least one processor (e.g., processor 1410 of FIG. 14)), and API mashups may be recommended. For example, the results may be refined and/or ranked via comparing the identified API mashups to one or more public repositories (e.g., API Harmony™, Github™, ProgrammableWeb™, etc.).

More specifically, for example, given a determined API mashup, a repository may be searched to attempt to identify the determined mashup. If the repository identifies the APIs of the determined mashup as being related (e.g., used in a project), the API mashup may be recommended (e.g., with a high priority). For example, Validic™ API and Fitbit™ API are used in some Github™ projects and, thus, an API mashup including Validic™ API and Fitbit™ API may be recommended with a high priority. As another example, for a given API mashup as an input, if related information in at least one repository is located, indicating the APIs in the given API mashup are related, the API mashup may be recommended (e.g., to an application developer) with high priority.

At block 214, API mashups may be disclosed to (e.g., recommended to) one or more third parties (e.g., application developers). For example, after an API mashup has been identified, and possibly ranked, the API mashup may be disclosed to (e.g., recommend to and/or provided to) at least one third party (e.g., an application developer).

Modifications, additions, or omissions may be made to method 200 without departing from the scope of the present disclosure. For example, the operations of method 200 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

In one contemplated example operation, a sub-cluster keyword combination may include "<security, administration>". This keyword combination may be obtained from real-world data collection and analysis. In this example, the "security" sub-cluster, includes a first API "API_1" and a second API "API_2". Further, the "administration" sub-cluster, includes a third API "API_3" and a fourth API "API_4". Continuing with this example, four possible API mashups combinations may be identified (e.g., <API1, API3>, <API1, API4>, <API2, API3>, and <API2, API4>). Further, via APIs descriptions, a similarity score (e.g., determined via a similarity analysis) for each possible API mashup may be calculated to identify API mashups. According to some examples, the greater the similarity score, the more plausible the API mashup. In some embodiments, the identified API mashups may be ranked, and possibly recommended to one or more third parties.

Figure 6:
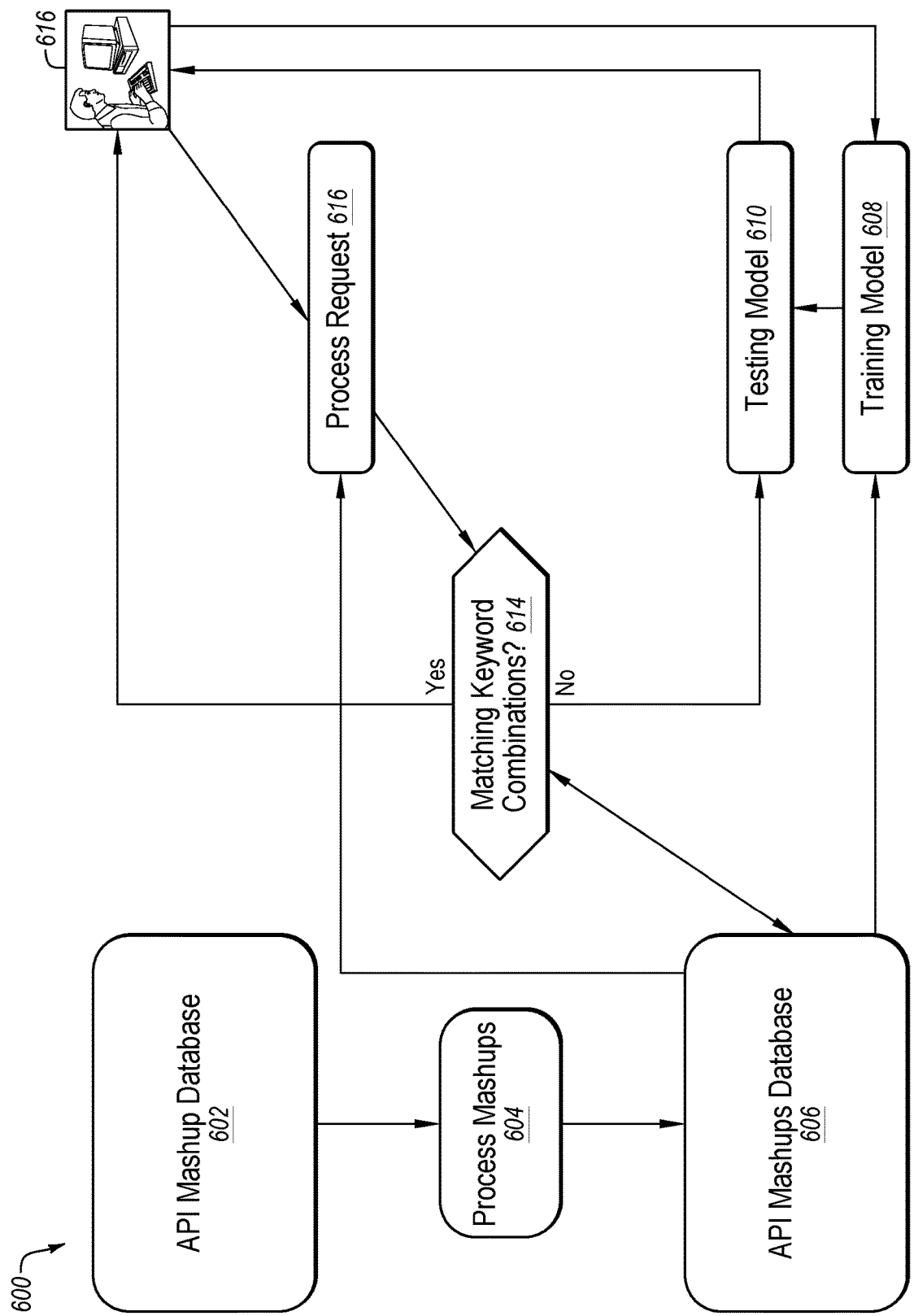
FIG. 6 is a diagram of an example flow that may be used for generating and processing one or more API mashups.

FIG. 6 is a diagram of an example flow 600 that may be used for generating and processing one or more API mashups, arranged in accordance with at least one embodiment described herein. Flow 600 may be performed by any suitable system, apparatus, or device. For example, system 100 (FIG. 1), system 1400 (FIG. 14), or one or more of the components thereof may perform one or more of the operations associated with flow 200. In these and other embodiments, program instructions stored on a computer readable medium may be executed to perform one or more of the operations of flow 200.

In some embodiments, one or more operations at one or more blocks and/or components of flow 600 may be performed via online processing. Further, one or more operations at one or more blocks and/or components of flow 600 may be performed via offline processing. For example, in at least one embodiments, operations at blocks 602, 604, and 606, and model 608 may be may be performed via offline processing, and operations at model 610 and blocks 612 and 614 may be may be performed via online processing.

At block 604, one or more generated API mashups from an API mashup database 602 may be processed to generate one or more refined (e.g., prioritized) API mashups of an API mashup database 606. According to various embodiments, API mashup database 602 may include one more API mashups generated via one or more embodiments disclosed herein. More specifically, API mashups of API mashup database 602 may be generated via one or more acts of method 200 (see FIG. 2) and/or via API mashup generator 104 (see FIG. 1). In some embodiments, API mashup database 602 may include API mashups generated for different domains (e.g., domain-specific API mashups), such as, for example only, medical, healthcare, business, office, science, ecommerce, etc.

For example, one or more API mashups of API mashup database 602 may be filtered, ranked, prioritized, and/or tested, via for example, input/output matching, API testing, and/or data format/unit compatibility verification, as described more fully herein, to generate the one or more refined API mashups of API mashup database 606. In accordance with various embodiments, in addition to refined API mashups for each sub-cluster keyword combination, API mashup database 606 may further include the sub-cluster keyword combinations.

Further, according to various embodiments, API descriptions (e.g., input, output, endpoint, etc.) may be, for example, filtered, validated, and/or processed (e.g., for matching purposes).

According to various embodiments, processing operations (e.g., at block 604) may be performed alone or in combination to validate, process, filter and/or rank APIs and/or API mashups. For example, the operations may be performed sequentially or in parallel. In some embodiments, API mashups that successfully pass one or more operations (e.g., filtering, testing, etc.) may be prioritized as high priority mashups and/or valid API mashups, and, in at least some embodiments, may be ranked based on weights assigned for each operation (e.g., filtering, testing, etc.). In some embodiments, API mashups may be prioritized as low priority mashups and/or invalid API mashups. Further, in some embodiments, similarity scores may be considered (e.g., to break a tie between API mashups).

For parsing descriptions, according to some embodiments, input descriptions and/or output descriptions for different endpoints may be assembled together for each API. In at least this example, the assembled description may be considered as API level input and/or output descriptions. For parsing descriptions according to other embodiments, input descriptions and/or output descriptions for each API endpoint may be separately considered. In at least this example, the descriptions may include API endpoint level input and/or output descriptions.

For example, with regard to input/output matching, for a generated API mashup (e.g., API_1, API_2), input/output descriptions of the API mashup may be identified and/or verified, and similarity scores may be calculated. For example, for an API mashup, if a similarity score is relatively high, either between API_1's input and API_2's output, or API_1's output and API_2's input, the API mashup may be designated as a high priority API and/or recommended (e.g., to a developer).

According to some embodiments, similarity scores between two different APIs (e.g. API1 and API2) may be calculated. As one example, API1 (input description)—API2 (output description) may be used for calculating a similarity score. As another example, API1 (output description)—API2 (input description) may be used for calculating a similarity score. In some embodiments, if an API's input or output description is "null," (e.g., the description for a given API is not included in API database block 102) the description may not be involved in the computation.

Further, in some embodiments, similarity analysis measurements may be based on descriptions of APIs. More specifically, the descriptions of each API in an API mashup may be separated into sentences, "stop" words and/or symbols may be removed, a word stemming operation may be performed, and NLP techniques may be used to convert each sentence into a word vector. Further, a hamming distance, for example, or other similarity metrics, among word vectors, may be computed. An average similarity score may be equal to sum(hamming distances)/total number of computations.

As an example, assuming the description of an API ("API1") includes two sentences (e.g., API1_s1 and API1_s2) and the description of another API ("API2") includes three sentences (e.g., API2_s1, API2_s2, and API2_s3), the hamming distance between every two sentences (Ham(API1_s1, API2_s1)) may be computed, and the similarity score may be equal to (Ham(API1_s1, API2_s1)+Ham(API1_s1, API2_s2)+Ham(API1_s1, API2_s3)+Ham(API1_s2, API2_s1)+Ham(API1_s2, API2_s2)+Ham(API1_s2, API2_s3))/6.

In some embodiments, similarity scores may be calculated between two different API/endpoints (e.g. API1/endpoint_x and API2/endpoint_y). In one example, API1/endpoint_x (input description)—API2/endpoint_y (output description) may be used for calculating a similarity score. In another example, API1/endpoint_x (output description)—API2/endpoint_y (input description) may be used for calculating a similarity score. In some embodiments, if an API/endpoint's input or output description is "null," (e.g., the description for a given API's endpoint is not included in original API documentations or API database block 102) the description may not be involved in the computation.

Figure 7A:
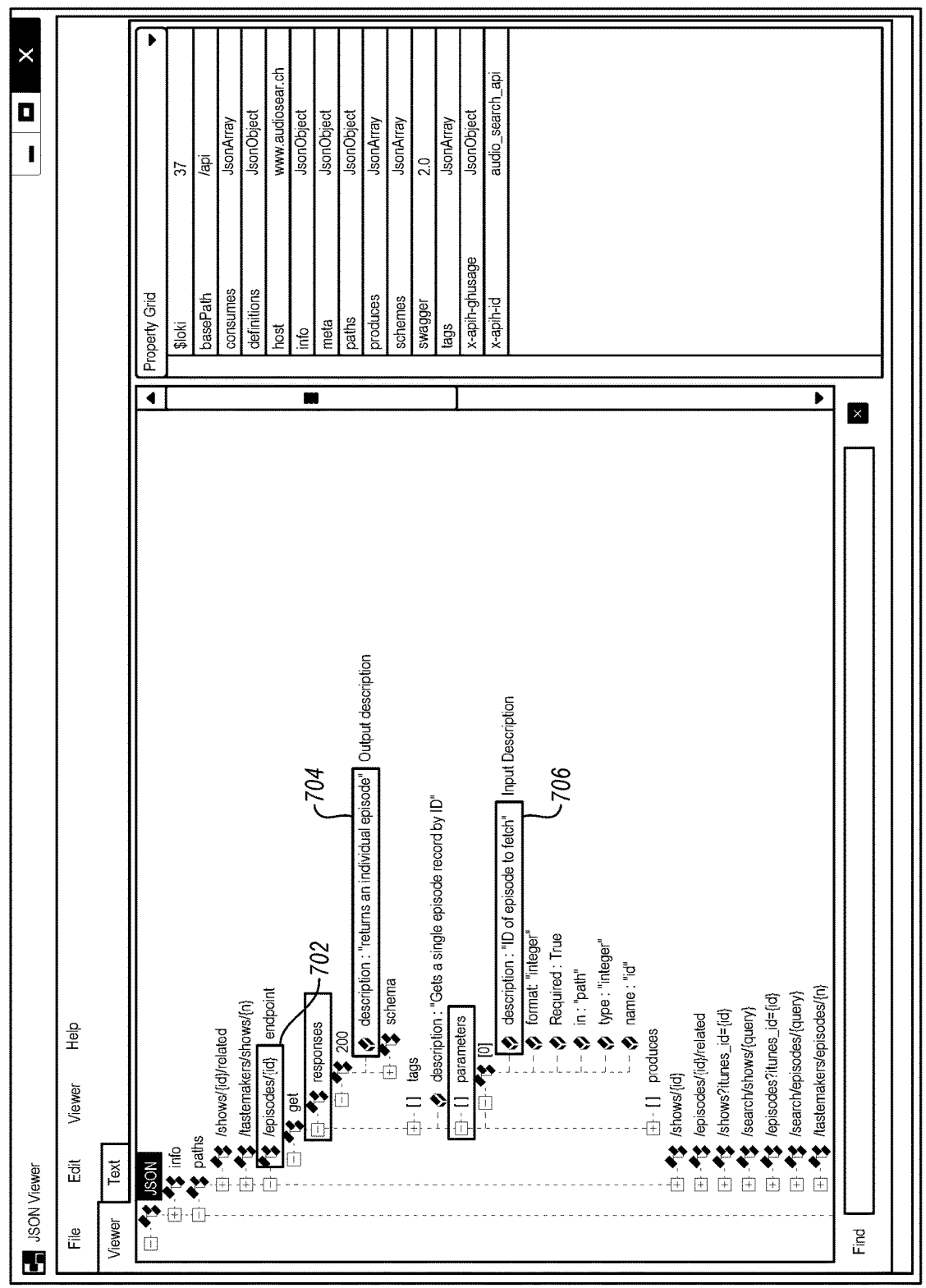
FIG. 7A depicts an example API including an endpoint, an input description, and an output description.
Figure 7B:
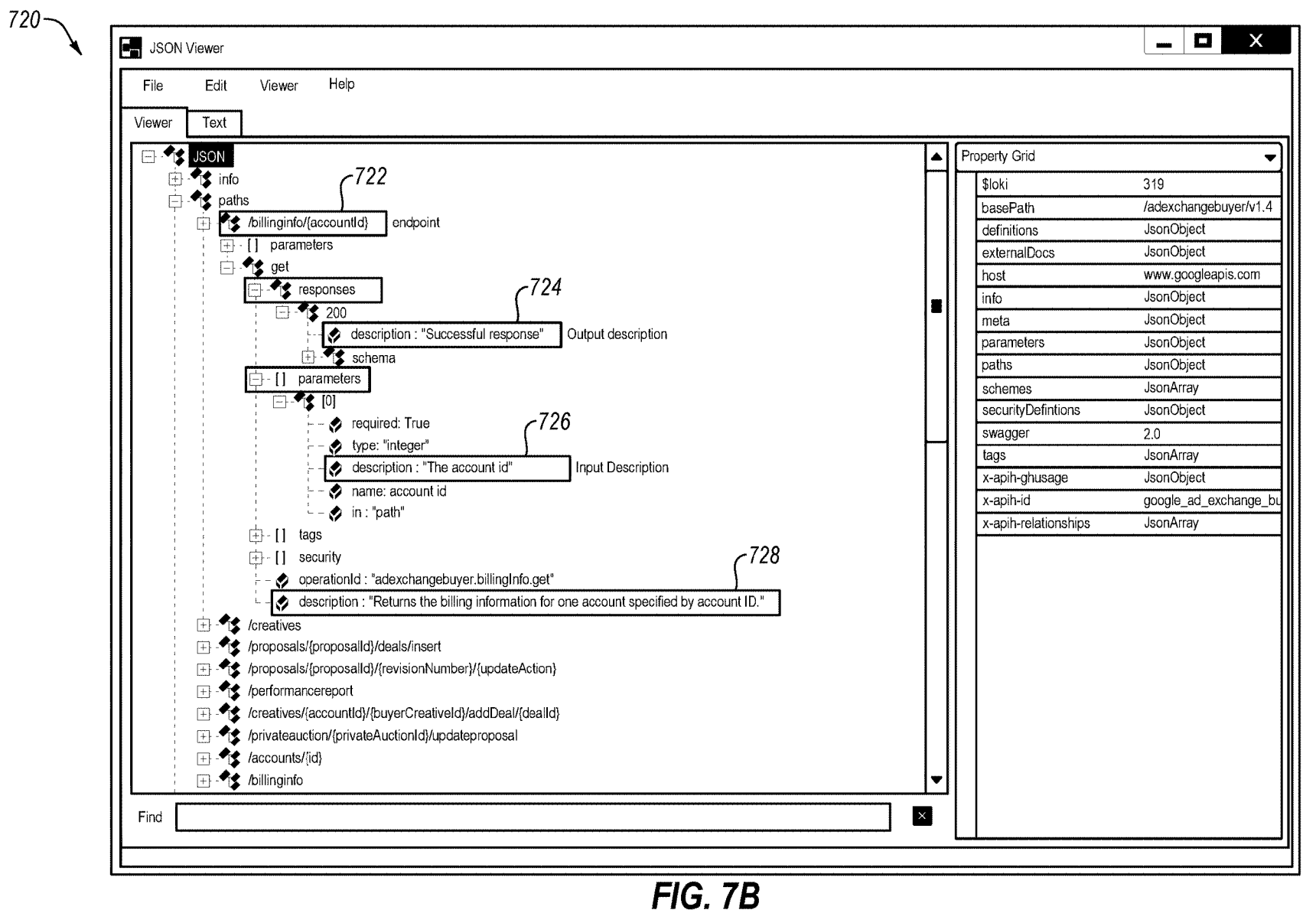

FIG. 7A illustrates an example API 700 including an endpoint 702, an output description 704, an input description 706 in JSON format. FIG. 7B illustrates an example API 720 including an endpoint 722, an output description 724, an input description 726, and an endpoint description 728 in JSON format. Unlike API 700 of FIG. 7A, some data (e.g., output descriptions 724) of API 720 lacks sufficient detail regarding the output and, therefore, may be invalid for matching purposes (e.g., not useful for processing). Thus, according to some embodiments as described more fully below, endpoint description 728, which may include data related to valid input and/or output description may be used for matching purposes. For example, a portion of endpoint description 728 ("Returns the billing information for one account") is related to an output description, and another portion of endpoint description 728 ("account ID") is related to an input description.

Descriptions (e.g., endpoint, input and/or output descriptions) may include typographical errors ("typos"), which may affect the accuracy of matching APIs for mashup generation. Some NLP tools (e.g. TextBlob) may correct typos in descriptions. However, accuracy, which may be around 70%, is less than ideal. Further, changes may not always be correct. For example, changes to particular names (e.g. API names, company's names, application's name, etc.), such as "botify" to "notify," "bing" to "being," or "aol" to "all" may be incorrect. Further, changes to abbreviations (e.g., "urls" to "curls" or "json" to "son"), changes to web links (e.g., "xx.aspx" to "xx.asp"), changes to words connected with symbols (e.g., "trip_id" to "tripped"), or changes to words lacking spaces (e.g., "accountid" to "accounts" or "inprogress" to "progress") may be incorrect.

In accordance with various embodiments of the present disclosure, a dictionary may be generated. For example, a dictionary may be generated by using all the endpoint descriptions (e.g., from a plurality of APIs). More specifically, for example, if a word appears more than a threshold number of times (e.g., 3, 4, 5, etc.) in the endpoint descriptions, it may be assumed that the word is correct and may be included in the description.

Figure 8:
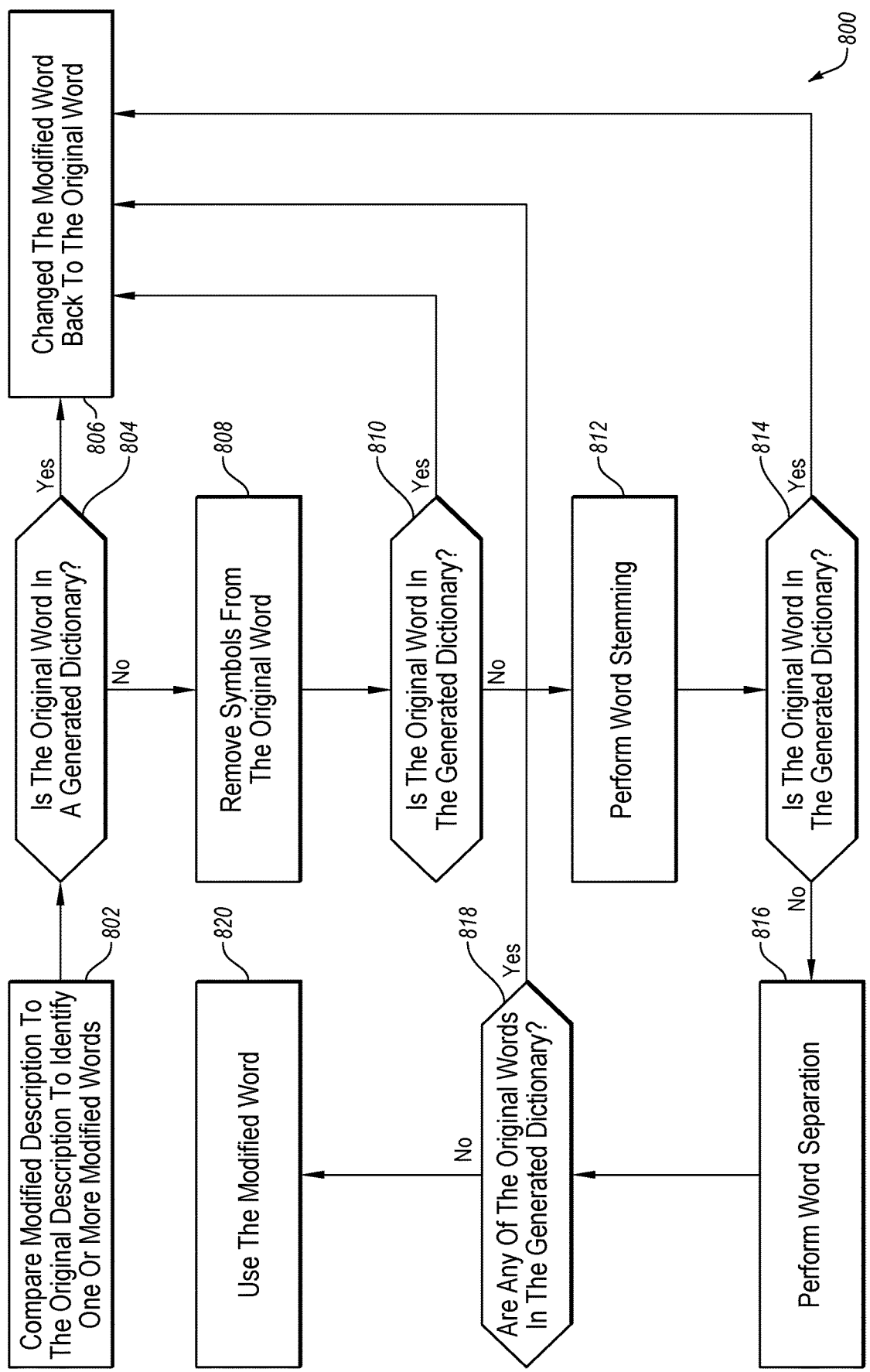
FIG. 8 shows an example flow diagram of a method of processing typographical errors in an API description.

FIG. 8 shows an example flow diagram of a method 800 of typo processing of API descriptions, arranged in accordance with at least one embodiment described herein. Although illustrated as discrete blocks, various blocks may be divided into additional blocks, combined into fewer blocks, or eliminated, depending on the desired implementation. For example, method 800 may be performed at block 604 of FIG. 6.

In some embodiments, method 800 may be performed by one or more devices and/or systems, such as system 100 of FIG. 1 and/or system 1400 of FIG. 14. For instance, processor 1410 of FIG. 14 may be configured to execute computer instructions stored on memory 1430 to perform functions and operations as represented by one or more of the blocks of method 800.

At block 802, a modified description of an API may be compared to an unmodified description of the API to identify one or more modified words, and method 800 may proceed to block 804. For example, processor 1410 of FIG. 14 may compare the modified description of an API to the unmodified description of the API to identify one or more modified words.

At block 804, for each modified word identified at block 802, a determination may be made as to whether an original word (e.g., unmodified), which is associated with the modified word, is in the generated dictionary. If the original word is in the generated dictionary, method 800 may proceed to block 806, wherein the modified word may be changed back to its original format (e.g., in the unmodified description). If the original word is not in the generated dictionary, method 800 may proceed to block 808. For example, processor 1410 of FIG. 14 may determine whether the modified word is in the generated dictionary.

At block 808, any symbols in the original word may be removed, and method 800 may proceed to block 810. For example, processor 1410 of FIG. 14 may detect and remove symbols from the original word.

At block 810, a determination may be made as to whether the original word is in the generated dictionary. If the original word is in the generated dictionary, method 800 may proceed to block 806, wherein the modified word may be changed back to its original format (e.g., in the unmodified description). If the original word is not in the generated dictionary, method 800 may proceed to block 812. For example, processor 1410 of FIG. 14 may determine whether the original word is in the generated dictionary.

At block 812, a word stemming operation may be performed on the original word, and method 800 may proceed to block 814. For example, processor 1410 of FIG. 14 may perform the word stemming operation.

At block 814, a determination may be made as to whether the original word is in the generated dictionary. If the original word is in the generated dictionary, method 800 may proceed to block 806, wherein the modified word may be changed back to its original format (e.g., in the unmodified description). If the original word is not in the generated dictionary, method 800 may proceed to block 816. For example, processor 1410 of FIG. 14 may determine whether the original word is in the generated dictionary.

At block 816, a word separation operation may be performed on the original word, and method 800 may proceed to block 818. For example, processor 1410 of FIG. 14 may perform the word stemming operation.

At block 818, a determination may be made as to whether any of the parts (e.g., separated words) of the original word are in the generated dictionary. If any part of the original word is in the generated dictionary, method 800 may proceed to block 806, wherein the modified word may be changed back to its original format (e.g., in the unmodified description). If the generated dictionary does not include any of the parts of the original word, method 800 may proceed to block 820. For example, processor 1410 of FIG. 14 may determine whether the original word is in the generated dictionary.

At block 820, the modified word may validated and used for matching. For example, processor 1410 of FIG. 14 may validate the modified word.

Modifications, additions, or omissions may be made to method 800 without departing from the scope of the present disclosure. For example, the operations of method 800 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Many API output descriptions may not be useful for matching purposes, and these output descriptions may need to be validated. In these embodiments, endpoint descriptions may be used for matching. These embodiments may include determining whether the endpoint description includes an input description, an output description, or both.

According to at least one embodiment, a pattern extraction and noun phase (NP) chunking based approach may be used. For example, features and/or patterns in an endpoint description may be identified and/or extracted. In some embodiments, endpoint descriptions may be short, and may include input and/or output descriptions. If an endpoint description includes an output description, the endpoint description may include one or more particular verbs, such as "return," "add," "update," "get," "insert," "replace," "list," "generate," "create," "enable," "install," "reinstall," and/or "retrieve."

Figure 9:
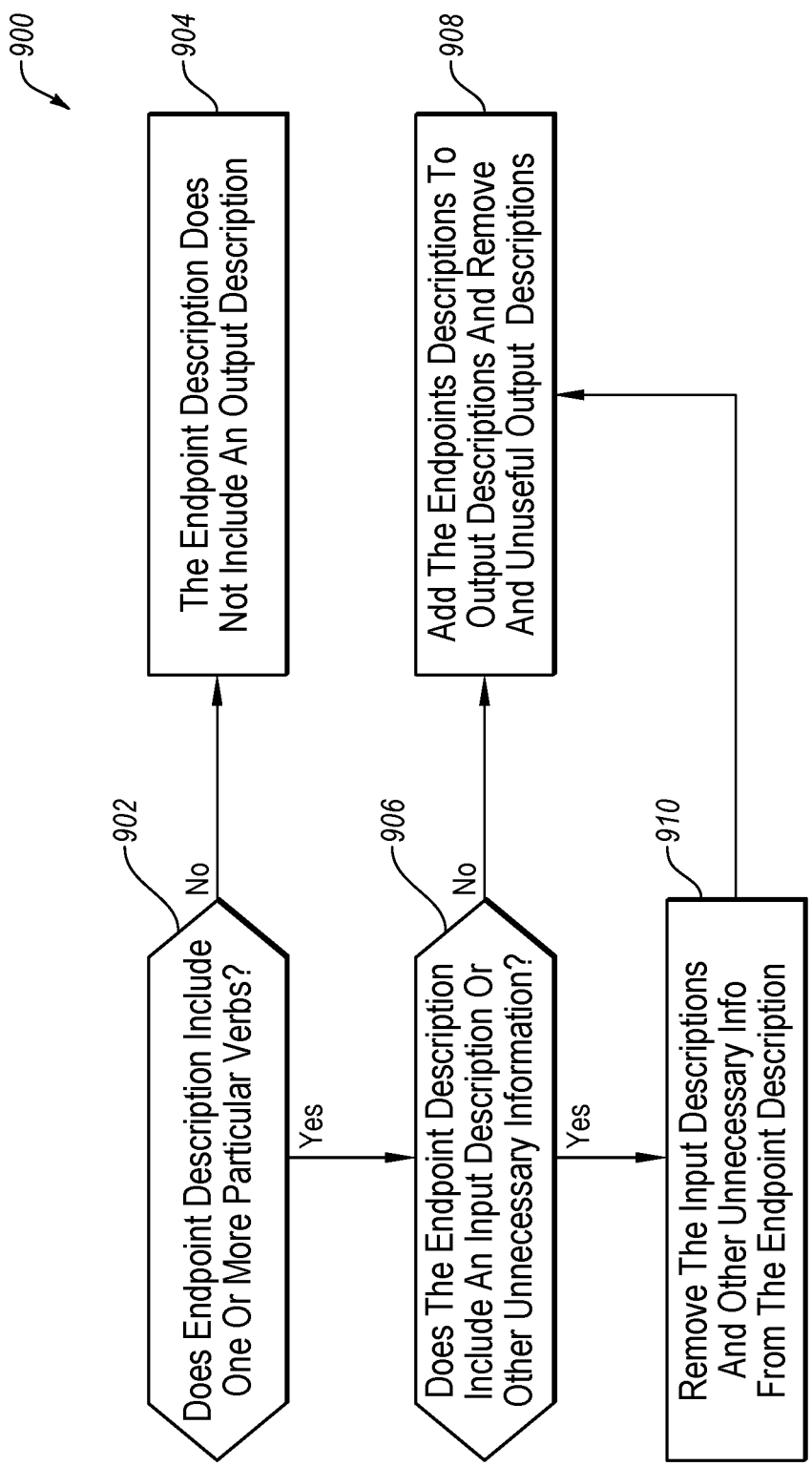
FIG. 9 shows an example flow diagram of a method of processing an API endpoint description.

FIG. 9 shows an example flow diagram of a method 900 of determining whether an endpoint description includes an output description, arranged in accordance with at least one embodiment described herein. Although illustrated as discrete blocks, various blocks may be divided into additional blocks, combined into fewer blocks, or eliminated, depending on the desired implementation. For example, method 900 may be performed at block 604 or integrated with block 604 of FIG. 6.

In some embodiments, method 900 may be performed by one or more devices and/or systems, such as system 100 of FIG. 1 and/or system 1400 of FIG. 14. For instance, processor 1410 of FIG. 14 may be configured to execute computer instructions stored on memory 1430 to perform functions and operations as represented by one or more of the blocks of method 900.

At block 902, a determination may be made as to whether the endpoint description includes one or more particular verbs. For example, processor 1410 of FIG. 14 may determine whether the endpoint description includes one or more particular verbs (e.g., return, add, update, get, insert, replace, list, generate, create, enable, install, reinstall, and/or retrieve). If it is determined that the endpoint description does not include one or more particular verbs, method 900 may proceed to block 904. If it is determined that the endpoint description includes one or more particular verbs, method 900 may proceed to block 906.

At block 904, it may be determined that the endpoint description does not include an output description. For example, processor 1410 of FIG. 14 may determine that the endpoint description does not include an output description.

At block 906, a determination may be made as to whether the endpoint description includes an input description and/or other unnecessary information. For example, processor 1410 of FIG. 14 may check whether the endpoint description includes an input description data and/or other unnecessary information. If it is determined that the endpoint description does not include an input description data and/or other unnecessary information, method 900 may proceed to block 908. If it is determined that the endpoint description includes an input description data and/or other unnecessary information, method 900 may proceed to block 910.

At block 908, the endpoint description may be added to the output description. Further, in some embodiments, any unnecessary and/or un-useful information (e.g., un-useful portion of the output description) may be removed from the output description. For example, processor 1410 of FIG. 14 may add the endpoint description to the output description and/or remove any unnecessary and/or un-useful information.

At block 910, the input description and/or unnecessary information may be removed from the endpoint description, and method 900 may proceed to block 908. For example, processor 1410 of FIG. 14 may remove the input description and/or unnecessary information from the endpoint description.

Modifications, additions, or omissions may be made to method 900 without departing from the scope of the present disclosure. For example, the operations of method 900 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

According to various embodiments, a dependency tree for a description (e.g., input, output, endpoint, etc.) may be constructed (e.g., via a parser). Further, an NP (noun phrase) chunking operation may be performed on the description. For example, for the endpoint description "returns the billing information for one account specified by account ID," an NP chunking operation may return: "billing information, one account, account ID."

According to some embodiments, NP chunking may be used to identify all the noun phrases of an input description and an endpoint description. Further, matching noun phrases (e.g., noun phrases in both the input description and endpoint description) may be removed from the endpoint descriptions. In addition, for the matching noun phrases, a "head" and "child," which are not nouns in the dependency tree, may be removed. For example, for the API: Ad Exchange Buyer, the input description may be "the account ID". An NP chunking operation may return "account ID." Further, for the endpoint description: "returns the billing information for one account specified by account ID," an NP chunking operation may return "billing information, one account, account ID." Moreover, "account ID" may be removed from the endpoint description. Heads of "account ID" which are not nouns in the dependency tree (including "specified" and "by" in this example) may be identified and removed. The remaining part of the endpoint description ("returns the billing information for one account") may be used as the output description.

According to at least one other embodiment, a machine learning, conditional random fields (CRFs) based approach may be used for processing descriptions (e.g., endpoint descriptions). In this embodiment, a training dataset may be generated from a plurality of API descriptions (e.g., endpoint descriptions). Further, words of the training dataset may be manually labeled. For example, each word of the training dataset may be manually labeled as being neither an input nor an output (e.g., "O"), a beginning word of an input (e.g., "B-I"), a beginning word of an output (e.g., "B-O"), an intermediate word of an input (e.g., "I-I"), or an intermediate word of an output (e.g., "I-O").

Figure 10:
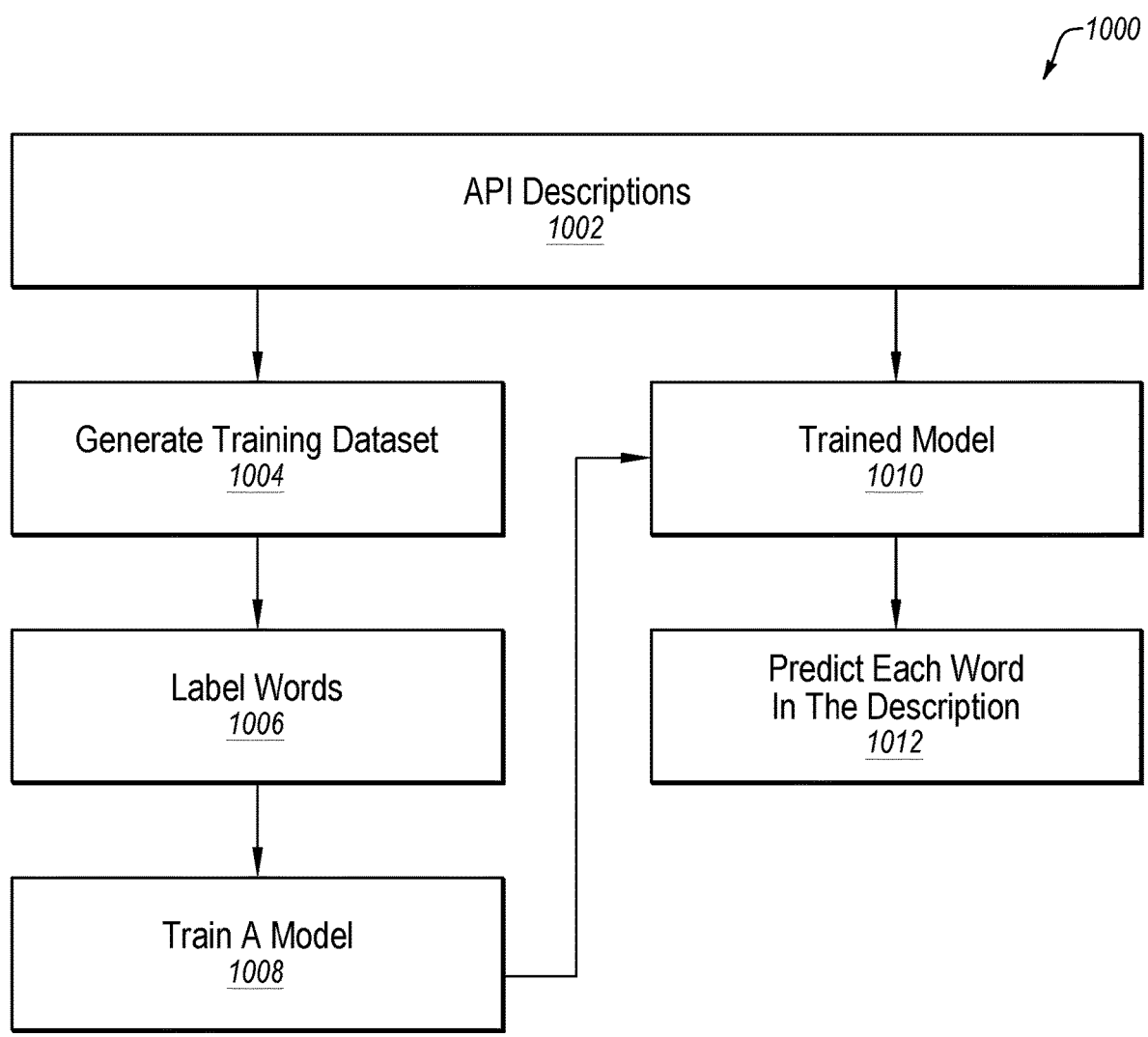
FIG. 10 shows an example flow diagram of another method of processing an API endpoint description.

FIG. 10 shows an example flow diagram of a method 1000 of processing an API description (e.g., endpoint description), arranged in accordance with at least one embodiment described herein. Although illustrated as discrete blocks, various blocks may be divided into additional blocks, combined into fewer blocks, or eliminated, depending on the desired implementation. For example, method 1000 may be performed at block 604 of FIG. 6.

In some embodiments, method 1000 may be performed by one or more devices and/or systems, such as system 100 of FIG. 1 and/or system 1400 of FIG. 14. For instance, processor 1410 of FIG. 14 may be configured to execute computer instructions stored on memory 1430 to perform functions and operations as represented by one or more of the blocks of method 1000.

At block 1004, based on at least some API descriptions of a plurality of API descriptions (e.g., API endpoint descriptions) 1002, a training dataset may be generated, and flow 1000 may proceed to block 1006. For example, processor 1410 of FIG. 14 may generate the training dataset.

At block 1006, words from the training dataset may be labeled (e.g., manually labeled) to train a model (e.g., a CRF model) at block 1000, resulting in trained model (e.g., trained CRF model) 1010. For example, processor 1410 of FIG. 14 may label words of the training dataset to train the model.

Trained model CFR 1010 may receive one or more API descriptions from API descriptions 1002, and, at block 1012, may predict whether one or more words in the received description is: neither an input nor an output (e.g., "O"); a beginning word of an input (e.g., "B-I"); a beginning word of an output (e.g., "B-O"); an intermediate word of an input (e.g., "I-I"); or an intermediate word of an output (e.g., "I-O"). For example, processor 1410 of FIG. 14 may perform the predictions.

Modifications, additions, or omissions may be made to method 1000 without departing from the scope of the present disclosure. For example, the operations of method 1000 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

In accordance with at least one other embodiment, an endpoint name validation based approach may be used for processing descriptions (e.g., endpoint descriptions). In this embodiment, for an endpoint, an input and/or an output may be identified. More specifically, for example, for the endpoint "/billinginfo/{accountid}", the portion in brackets (e.g., "{ }") (e.g., "accountId") may be identified as being related to an input. Further, "billinginfo" may be identified as being related to an output. The use of brackets (e.g., "{ }") to identify an input is just an example and different API providers may use different symbols to represent inputs and/or outputs.

Continuing with this example, because "accountId" and "billinginfo" are not single existing words, a word separation operation may be performed. For example, accountid may be separated into "account id" and "billinginfo" may be separated into "billing info".

Further, based on the API descriptions and other descriptions (e.g., input/output/endpoint descriptions), a corpus of the words may be generated and ranked based on a frequency that the word appears in all the descriptions. For example, following Zipfs law, a word with a rank n in the list of words has probability roughly 1/(n log N), wherein N is the number of words in the corpus.

Moreover, dynamic programming (e.g.., search each possible combination starting from the end of the word) may be used to identify the most likely places to separate a word (e.g., to maximize the product of the probability of each individual word). In addition, according to at least some embodiments, instead of directly using the probability, a cost defined as the logarithm of the inverse of the probability (e.g., cost=−log(probability)) may be used.

Moreover, the endpoint names (e.g., input names, output names) may be used to verify whether the endpoint names are similar to the input and/or output descriptions. If the endpoint names are similar to the input and/or output descriptions, the corresponding descriptions may be considered accurate. Also, the endpoint names may be used verify whether endpoint descriptions include information related to inputs and/or outputs.

Figure 11:
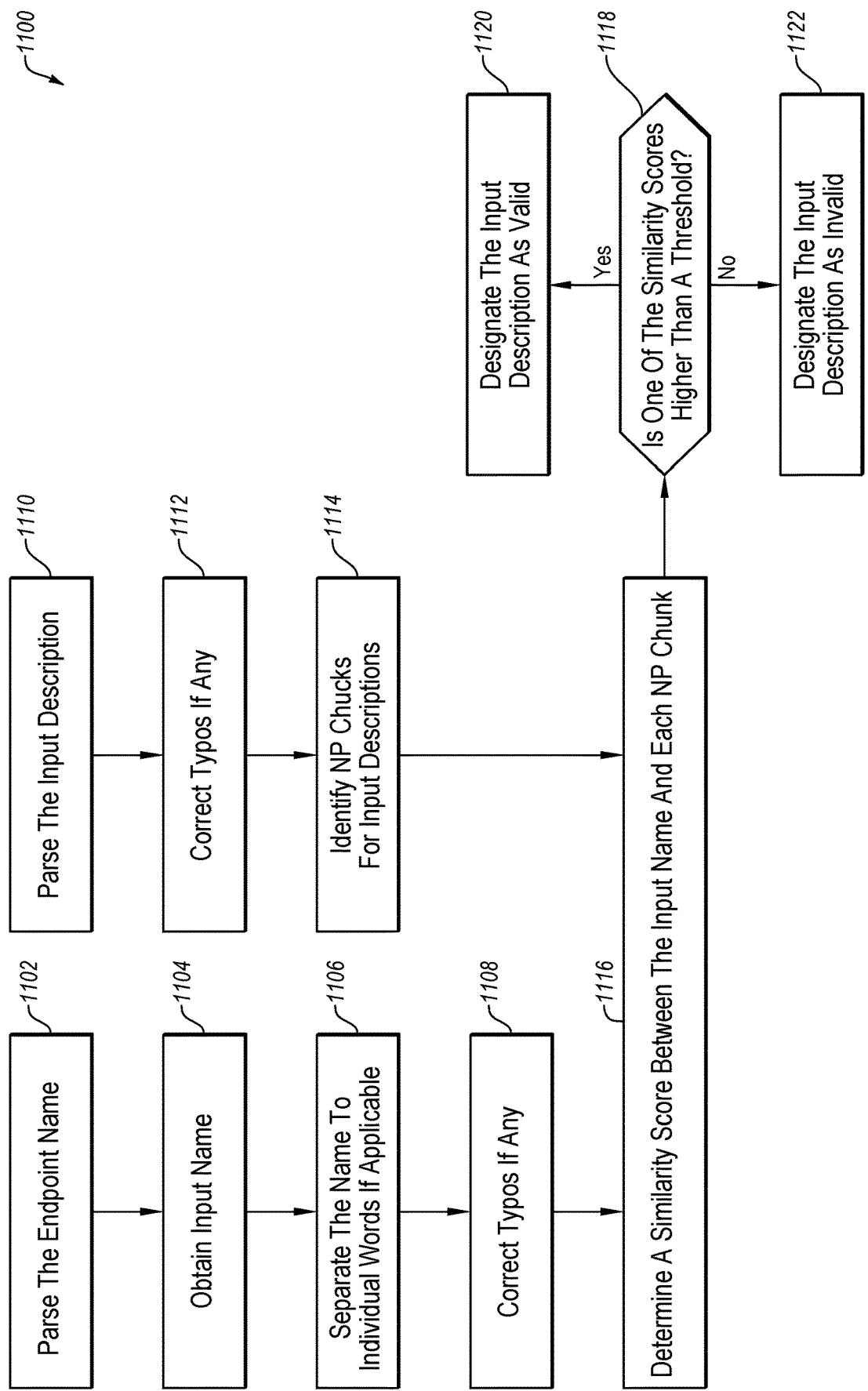
FIG. 11 shows an example flow diagram of a method of validating a API description.

FIG. 11 shows an example flow diagram of a method 1100 of validating a description, arranged in accordance with at least one embodiment described herein. Although illustrated as discrete blocks, various blocks may be divided into additional blocks, combined into fewer blocks, or eliminated, depending on the desired implementation. For example, method 1100 may be performed at block 604 or integrated with block 604 of FIG. 6.

In some embodiments, method 1100 may be performed by one or more devices and/or systems, such as system 100 of FIG. 1 and/or system 1400 of FIG. 14. For instance, processor 1410 of FIG. 14 may be configured to execute computer instructions stored on memory 1430 to perform functions and operations as represented by one or more of the blocks of method 1400.

At block 1102, an endpoint name may be parsed, and method 1100 may proceed to block 1104. More specifically, for example, the endpoint name may be parsed to identify words, symbols, characters, etc. For example, processor 1410 of FIG. 14 may parse the endpoint name.

At block 1104, an input name may be identified from the endpoint name, and method 1100 may proceed to block 1106. For example, based on words, symbols, and/or characters, the input name may be identified. For example, processor 1410 of FIG. 14 may identify the input name.

At block 1106, the input name may be separated into individual words, if necessary, and method 1100 may proceed to block 1108. For example, based on a corpus of words and/or dynamic programming, the input name may be separated into two or more individual words, if necessary. For example, processor 1410 of FIG. 14 may separate the input name into two or more words.

At block 1108, typographical errors in the words, if any, may be corrected, and method 1100 may proceed to block 1116. For example, processor 1410 of FIG. 14 may correct any typographical errors.

At block 1110, an input description may be parsed, and method 1100 may proceed to block 1112. More specifically, for example, the input description may be parsed to identify words, symbols, characters, etc. For example, processor 1410 of FIG. 14 may parse the input description.

At block 1112, typographical errors in the input description may be corrected, and method 1100 may proceed to block 1114. For example, processor 1410 of FIG. 14 may correct any typographical errors.

At block 1114, NP chunks for the input description may be identified, and method 1100 may proceed to block 1116. For example, processor 1410 of FIG. 14 may identify NP chunks for the input description.

At block 1116, similarity scores between the input name and each identified NP chuck may be determined, and method 1100 may proceed to block 1118. For example, processor 1410 of FIG. 14 may, via word embedding, determine similarity scores between the input name and each identified NP chuck.

At block 1118, a determination may be made as to whether at least one similarity score is above a threshold value. If at least one similarity score is above a threshold value, method 1100 may proceed to block 1120. If at least one similarity score is not above the threshold value, method 1100 may proceed to block 1122. For example, processor 1410 of FIG. 14 may determine whether at least one similarity score is above a threshold value.

At block 1120, the input description may be designated as valid. At block 1122, the input description may be designated as invalid. For example, processor 1410 of FIG. 14 may designated the input description as valid or invalid.

Modifications, additions, or omissions may be made to method 1100 without departing from the scope of the present disclosure. For example, the operations of method 1100 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Figure 12:
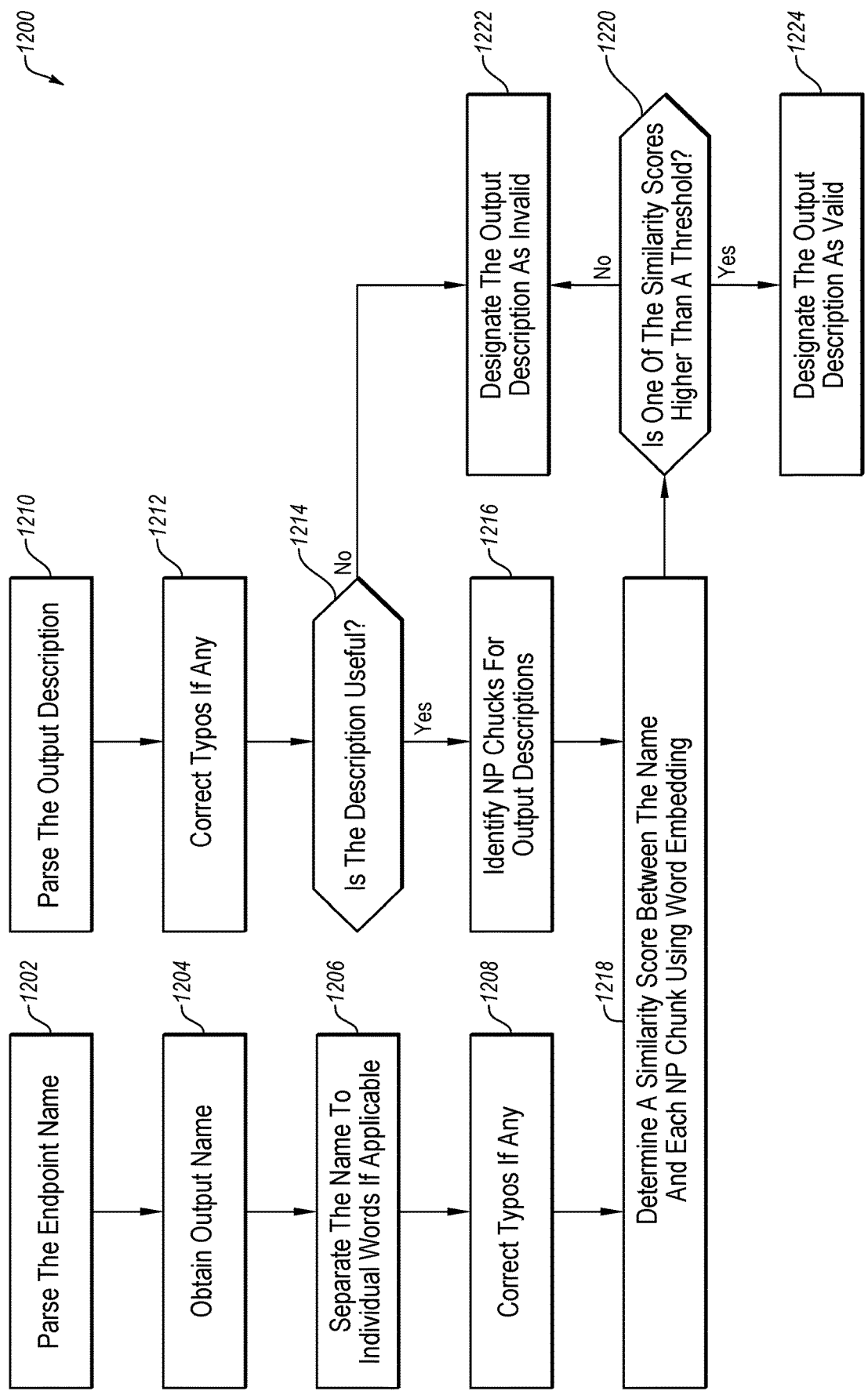
FIG. 12 shows an example flow diagram of another method of validating a API description.

FIG. 12 shows an example flow diagram of another method 1200 of validating a description, arranged in accordance with at least one embodiment described herein. Although illustrated as discrete blocks, various blocks may be divided into additional blocks, combined into fewer blocks, or eliminated, depending on the desired implementation. For example, method 1200 may be performed at block 604 or integrated with block 604 of FIG. 6.

In some embodiments, method 1200 may be performed by one or more devices and/or systems, such as system 100 of FIG. 1 and/or system 1400 of FIG. 14. For instance, processor 1410 of FIG. 14 may be configured to execute computer instructions stored on memory 1430 to perform functions and operations as represented by one or more of the blocks of method 1200.

At block 1202, an endpoint name may be parsed, and method 1200 may proceed to block 1204. More specifically, for example, the endpoint name may be parsed to identify words, symbols, characters, etc. For example, processor 1410 of FIG. 14 may parse the endpoint name.

At block 1204, an output name may be identified from the endpoint name, and method 1200 may proceed to block 1206. For example, based on words, symbols, and/or characters, the output name may be identified. For example, processor 1410 of FIG. 14 may identify the output name.

At block 1206, the output name may be separated into two or more individual words, if necessary, and method 1200 may proceed to block 1208. For example, based on a corpus of words and/or dynamic programming, the output name may be separated into two or more individual words, if necessary. For example, processor 1410 of FIG. 14 may separate the output name into two or more individual words.

At block 1208, typographical errors in the words, if any, may be corrected, and method 1200 may proceed to block 1216. For example, processor 1410 of FIG. 14 may correct any typographical errors.

At block 1210, an output description may be parsed, and method 1200 may proceed to block 1212. More specifically, for example, the output description may be parsed to identify words, symbols, characters, etc. For example, processor 1410 of FIG. 14 may parse the output description.

At block 1212, typographical errors in the output description may be corrected, and method 1200 may proceed to block 1214. For example, processor 1410 of FIG. 14 may correct any typographical errors.

At block 1214, a determination may be made as to whether the output description is useful (e.g., valid for matching purposes). If the output description is useful, method 1200 may proceed to block 1216. If the output description is not useful, method 1200 may proceed to block 1222. For example, processor 1410 of FIG. 14 may determine whether the output description is useful.

At block 1216, NP chunks for the output description may be identified, and method 1200 may proceed to block 1218. For example, processor 1410 of FIG. 14 may identify NP chunks for the output description.

At block 1218, similarity scores between the output name and each identified NP chuck for the output description may be determined, and method 1200 may proceed to block 1220. For example, processor 1410 of FIG. 14 may, via word embedding, determine similarity scores between the output name and each identified NP chuck.

At block 1220, a determination may be made as to whether at least one similarity score is above a threshold value. If at least one similarity score is above a threshold value, method 1200 may proceed to block 1224. If at least one similarity score is not above the threshold value, method 1200 may proceed to block 1222. For example, processor 1410 of FIG. 14 may determine whether at least one similarity score is above a threshold value.

At block 1222, the input description may be designated as invalid. At block 1224, the input description may be designated as valid. For example, processor 1410 of FIG. 14 may designated the output description as valid or invalid.

Modifications, additions, or omissions may be made to method 1200 without departing from the scope of the present disclosure. For example, the operations of method 1200 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Figure 13A:
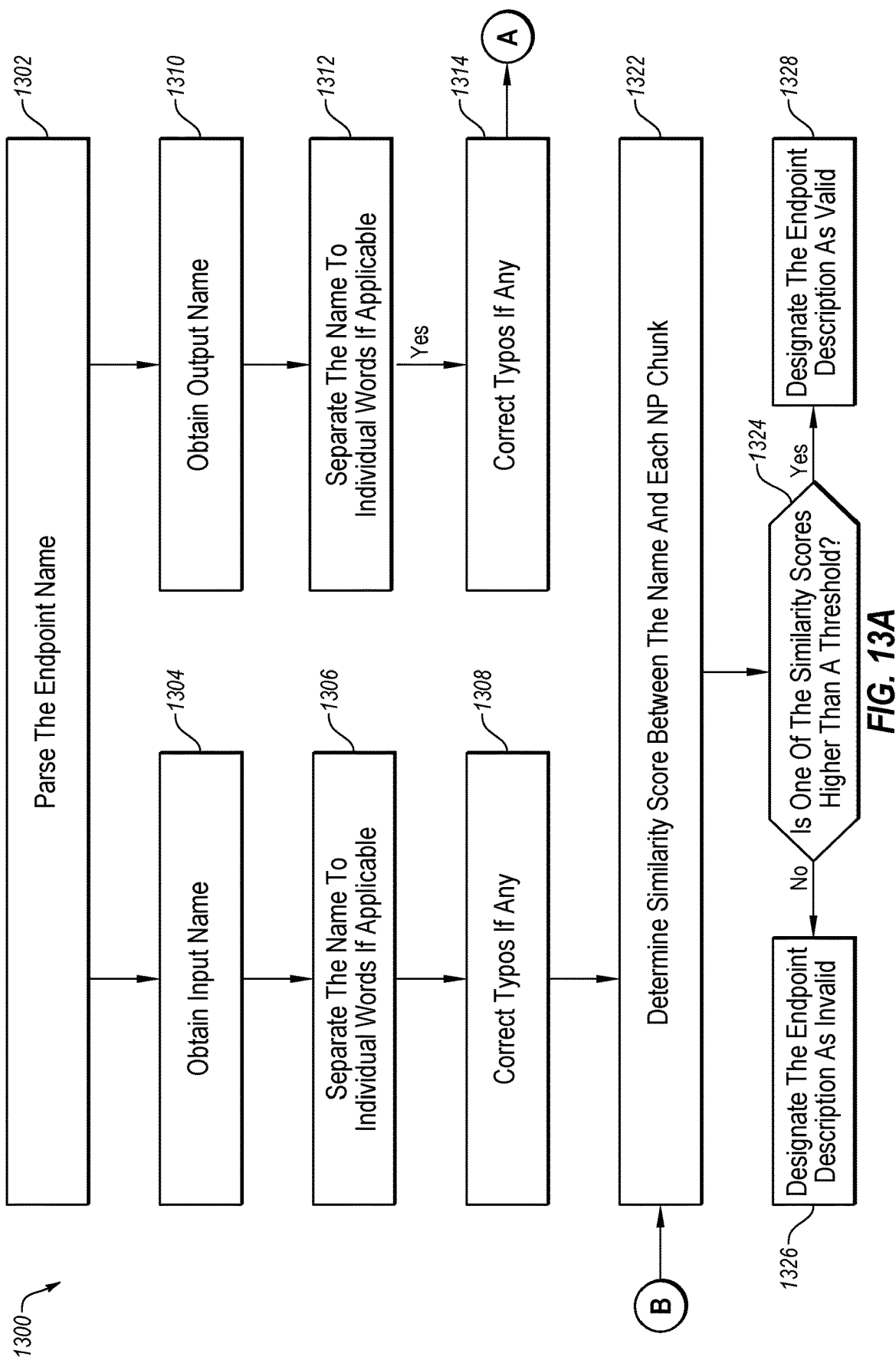
FIGS. 13A and 13B show an example flow diagram of yet another method of validating a API description.
Figure 13B:
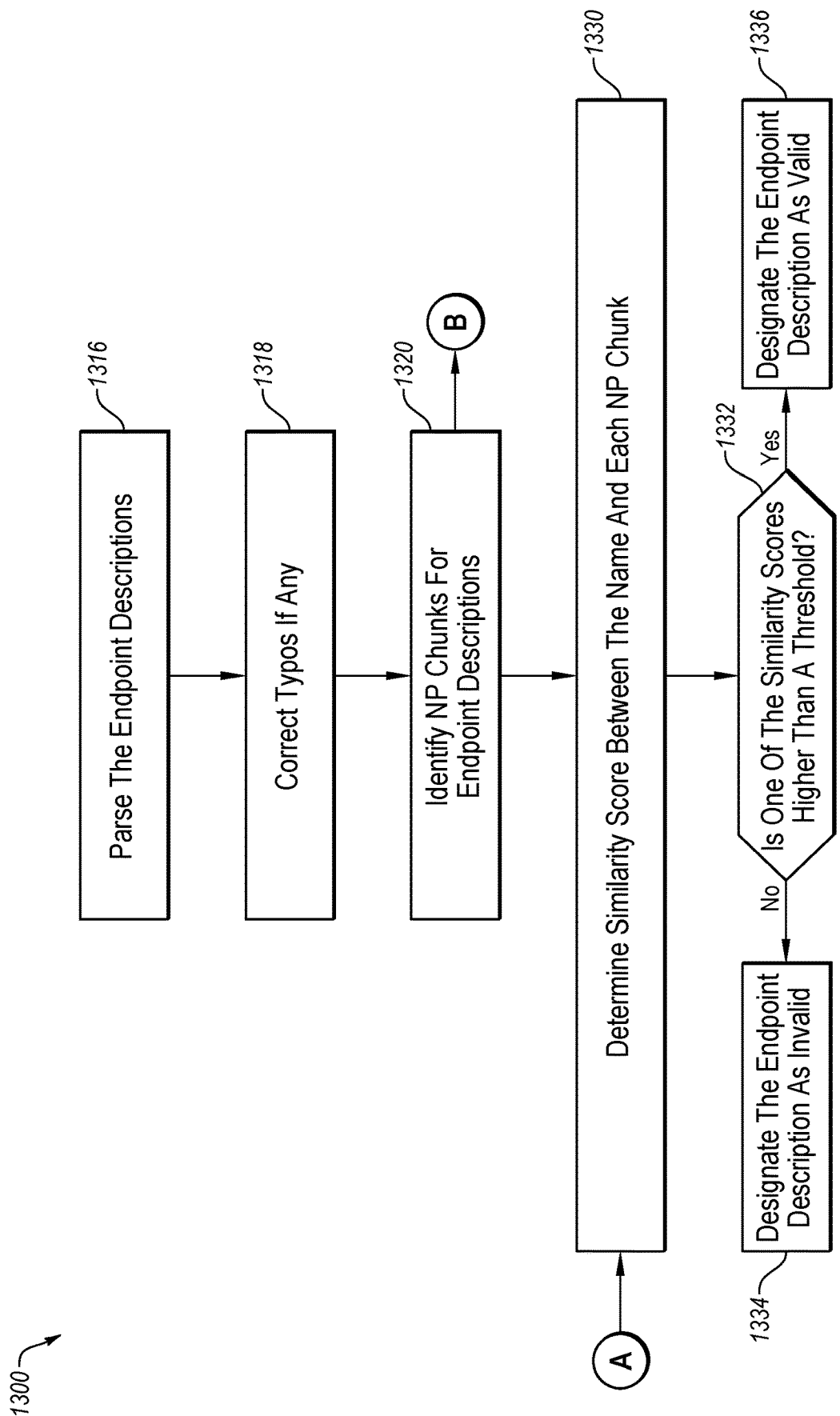

FIGS. 13A and 13B show an example flow diagram of yet another method 1300 of validating a description, arranged in accordance with at least one embodiment described herein. Although illustrated as discrete blocks, various blocks may be divided into additional blocks, combined into fewer blocks, or eliminated, depending on the desired implementation. For example, method 1300 may be performed at block 604 of FIG. 6.

In some embodiments, method 1300 may be performed by one or more devices and/or systems, such as system 100 of FIG. 1 and/or system 1400 of FIG. 14. For instance, processor 1410 of FIG. 14 may be configured to execute computer instructions stored on memory 1430 to perform functions and operations as represented by one or more of the blocks of method 1300.

At block 1302, an endpoint name may be parsed, and method 1300 may proceed to block 1304. More specifically, for example, the endpoint name may be parsed to identify words, symbols, characters, etc. For example, processor 1410 of FIG. 14 may parse the endpoint name.

At block 1304, an input name may be identified from the endpoint name, and method 1300 may proceed to block 1306. For example, based on words, symbols, and/or characters, the input name may be identified. For example, processor 1410 of FIG. 14 may identify the input name.

At block 1306, the input name may be separated into individual words, if necessary, and method 1300 may proceed to block 1308. For example, based on a corpus of words and/or dynamic programming, the input name may be separated into two or more words, if necessary. For example, processor 1410 of FIG. 14 may separate the input name into two or more words.

At block 1308, typographical errors in the words, if any, may be corrected, and method 1300 may proceed to block 1322. For example, processor 1410 of FIG. 14 may correct any typographical errors.

At block 1310, an output name may be identified from the endpoint name, and method 1300 may proceed to block 1312. For example, based on words, symbols, and/or characters, the output name may be identified. For example, processor 1410 of FIG. 14 may identify the output name.

At block 1312, the output name may be separated into words, if necessary, and method 1300 may proceed to block 1314. For example, based on a corpus of words and/or dynamic programming, the output name may be separated into two or more words, if necessary. For example, processor 1410 of FIG. 14 may separate the output name into two or more words.

At block 1314, typographical errors in the words, if any, may be corrected, and method 1300 may proceed to block 1322. For example, processor 1410 of FIG. 14 may correct any typographical errors.

At block 1316, endpoint descriptions may be parsed, and method 1300 may proceed to block 1318. More specifically, for example, the endpoint descriptions may be parsed to identify words, symbols, characters, etc. For example, processor 1410 of FIG. 14 may parse the endpoint descriptions.

At block 1318, typographical errors in the endpoint descriptions may be corrected, and method 1300 may proceed to block 1320. For example, processor 1410 of FIG. 14 may correct any typographical errors.

At block 1320, NP chunks for the endpoint descriptions may be identified, and method 1300 may proceed to block 1322 and/or block 1330. For example, processor 1410 of FIG. 14 may identify NP chunks for the endpoint descriptions.

At block 1322, similarity scores between the input name and each identified NP chuck for the endpoint description may be determined, and method 1300 may proceed to block 1324. For example, processor 1410 of FIG. 14 may, via word embedding, determine similarity scores between the input name and each identified NP chuck.

At block 1324, a determination may be made as to whether at least one similarity score is above a threshold value. If at least one similarity score is above a threshold value, method 1300 may proceed to block 1328. If at least one similarity score is not above the threshold value, method 1300 may proceed to block 1326. For example, processor 1410 of FIG. 14 may determine whether at least one similarity score is above a threshold value.

At block 1326, the endpoint description may be designated as invalid. At block 1328, the endpoint description may be designated as valid. For example, processor 1410 of FIG. 14 may designated the endpoint description as valid or invalid.

At block 1330, similarity scores between the output name and each identified NP chuck for the endpoint description may be determined, and method 1300 may proceed to block 1332. For example, processor 1410 of FIG. 14 may, via word embedding, determine similarity scores between the output name and each identified NP chuck.

At block 1332, a determination may be made as to whether at least one similarity score is above a threshold value. If at least one similarity score is above a threshold value, method 1300 may proceed to block 1336. If at least one similarity score is not above the threshold value, method 1300 may proceed to block 1334. For example, processor 1410 of FIG. 14 may determine whether at least one similarity score is above a threshold value.

At block 1334, the endpoint description may be designated as invalid. At block 1336, the endpoint description may be designated as valid. For example, processor 1410 of FIG. 14 may designated the endpoint description as valid or invalid.

Modifications, additions, or omissions may be made to method 1300 without departing from the scope of the present disclosure. For example, the operations of method 1300 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

As disclosed herein an input description may include a validated input description and/or an identified input portion of a validated endpoint description. Further, an output description may include a validated output description and/or an identified output portion of a validated endpoint description.

Moreover, one or more matching-based mashup generation methods, as disclosed herein, may be used. For example, if an API_1's output description is similar to API_2's input description, then API_1 and API_2 is likely to be a plausible mashup.

These and other embodiments may be applicable to various levels (e.g., API level, endpoint level, HTTP method level, and/or parameter level). For example, for an API level, an input description of API1 may be compared and/or matched to an output description of API2. Further, an output description of API1 may be compared and/or matched to an input description of API.

For an endpoint level, "API1/endpoint_x (input description)" may be compared and/or matched to "API2/endpoint_y (output description)." Moreover, "API1/endpoint_x (output description)" may be compared and/or matched to "API2/endpoint_y (input description)."

For an HTTP method level (e.g. "Get," "Post," etc.), "API1/endpoint_x/method_a (input description)" may be compared and/or matched to "API2/endpoint_y/method_b (output description)." Further, "API1/endpoint_x/method_a (output description)" may be compared and/or matched to "API2/endpoint_y/method_b (input description)."

For a parameter level, "API1/endpoint_x/method_a/parameter [i] (input description)" may be compared and/or matched to "API2/endpoint_y/method_b/response [j] (output description)." In addition, "API1/endpoint_x/method_a/parameter [i] (output description)" may be compared and/or matched to "API2/endpoint_y/method_b/response [j] (input description)."

Alternatively, or additionally, one or more replacement-based mashup generation methods, as disclosed herein, may be used. For example, if API_1's input/output description is similar to API_2's input/output description, and if API_1 and API_3 is a plausible mashup, then it may be likely that API_2 and API_3 is a plausible mashup. These and other embodiments may also be applicable to various levels (e.g., API level, endpoint level, HTTP method level, and/or parameter level).

As described more fully herein, various embodiment may provide for automatically recommending API combinations to, for example, satisfy application developer's requirements. Other, more general use cases, may also exist. For example, various embodiments may be applicable to service chaining and/or functional chaining in a network system. More specifically, for example, a service proxy may interpret a request (e.g., natural language request) and translate the request into functional chaining of distributed microservices (e.g., chaining among different APIs, and data).

With reference again to FIG. 6, although API mashup database 606 (e.g., including sub-cluster key word combinations and API mashups for each combination) has been filtered and/or refined, database 606, in some embodiments, may not evaluate all API mashups and/or keyword combinations (e.g., via offline processing). Thus, various embodiments of the present disclosure may include utilizing one or more learning models (e.g., machine learning and/or deep learning models) to predict whether or not some APIs may be combined and used for a plausible API mashup.

For example, in some embodiments, at least one model may include a training model 608, and at least one other model may include a testing module 610. Although model 608 and model 610 are illustrated as two models, model 608 and model 610 could be the same machine learning or deep learning model. According to some embodiments, the one or more models may include information related to features of API mashups (e.g., specification information regarding each API) such as title, category, primary category, secondary category, link, description, protocol formats, etc. Further, for example, one or more machine learning and/or deep learning algorithms may be utilized, such as CNN and/or LSTM.

In some embodiments, one or more training datasets, which may include data from API mashups database 606, may be received by training model 608. Further, feedback from a developer 616 (e.g., a developer's selection of API mashups (e.g., like or dislike)) may be received at model 608 and may be used to generate and/or update training model 608. For different machine learning or deep learning algorithms, the model training may require only the valid API mashup dataset, or both of the valid and invalid API mashup dataset, which may prioritized in block 606.

At block 612, a request (e.g., from a third party, such as developer 616) may be processed. For example, as illustrated in flow 600, request processing may be based on one or more inputs, such as a request (also referred to herein as a "query") (e.g., natural language description of service requirements) from developer 616 and/or one or more API mashups and/or sub-cluster keywords from API mashup database 606. Further, in response to the request processing, an output, which may include one or more keyword combinations, may be generated.

Further, in some embodiments, at block 614 of FIG. 6, a keyword combination generated (e.g., at block 612) may be compared to keyword combinations of database 606 to determine if there is a match between the generated keyword combination (e.g., from the query) and keyword combinations of database 606. If a match exists, the associated API mashups from database 606 may be provided to developer 616. If a match does not exist, for each keyword of the keyword combination, related APIs (e.g., from block 606) may be identified, and all the possible API combinations for the identified APIs may be identified.

Further, each of the API combinations may be conveyed to model 610, and model 610, which is trained based on the machine learning or deep learning algorithms and existing API mashup dataset of block 606, may generate an output, such as a label (e.g., "1" or "0"), that may represent whether or not the received APIs may be combined as a valid API mashup. For example, if the label is 1, the API mashup may be designated (e.g., prioritized) as a high priority mashup and/or may be provided to developer 616 as a plausible API mashup. Further, for example, if the label is 0, the API mashup may be designated (e.g., prioritized) as a low priority mashup.

Further, according to some embodiments, in response to a recommended API mashup, developer 616 may select whether he/she likes or dislikes the API mashup. This selection may be provided as feedback to the learning model (e.g., at model 608) to update and/or refine the learning model.

In some embodiments, if an API mashup is originally labeled with a 1 (e.g., valid/high priority API mashup) (e.g., via testing model 608), but a number of developers (e.g., a majority of developers) do not like the API mashup, the API mashup may be relabeled with a "0." In some embodiments, if an API mashup is originally labeled with a "0" (e.g., invalid/low priority API mashup), but a number of developers (e.g., a majority of developers) like the API mashup, the API mashup may be relabeled as a "1."

Further, according to some embodiments, any datasets (e.g., a new dataset) may be used to re-train the learning models. Moreover, in some embodiments, model 608, which may be trained (e.g., via information from database 606 and/or feedback from developer 616), may update model 610 to enable model 610 to more accurately predict whether or not received APIs may be combined as a plausible API mashup.

FIG. 14 is a block diagram of an example computing system 1400, in accordance with at least one embodiment of the present disclosure. For example, system 100 (see FIG. 1), system 500 (see FIG. 5), system 1400 (see FIG. 14), or one or more components thereof, may be implemented as computing system 1400. Computing system 1400 may include a desktop computer, a laptop computer, a server computer, a tablet computer, a mobile phone, a smartphone, a personal digital assistant (PDA), an e-reader device, a network switch, a network router, a network hub, other networking devices, or other suitable computing device.

Computing system 1400 may include processor 1410, a storage device 1420, a memory 1430, and a communication device 1440. Processor 1410, storage device 1420, memory 1430, and/or communication device 1440 may all be communicatively coupled such that each of the components may communicate with the other components. Computing system 1400 may perform any of the operations described in the present disclosure.

In general, processor 1410 may include any suitable special-purpose or general-purpose computer, computing entity, or processing device including various computer hardware or software modules and may be configured to execute instructions stored on any applicable computer-readable storage media. For example, processor 1410 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 14, processor 1410 may include any number of processors configured to perform, individually or collectively, any number of operations described in the present disclosure.

In some embodiments, processor 1410 may interpret and/or execute program instructions and/or process data stored in storage device 1420, memory 1430, or storage device 1420 and memory 1430. In some embodiments, processor 1410 may fetch program instructions from storage device 1420 and load the program instructions in memory 1430. After the program instructions are loaded into memory 1430, processor 1410 may execute the program instructions.

For example, in some embodiments one or more of the processing operations of a device and/or system (e.g., an application program, a server, etc.) may be included in data storage 1420 as program instructions. Processor 1410 may fetch the program instructions of one or more of the processing operations and may load the program instructions of the processing operations in memory 1430. After the program instructions of the processing operations are loaded into memory 1430, processor 1410 may execute the program instructions such that computing system 1400 may implement the operations associated with the processing operations as directed by the program instructions.

Storage device 1420 and memory 1430 may include computer-readable storage media for carrying or having computer-executable instructions or data structures stored thereon. Such computer-readable storage media may include any available media that may be accessed by a general-purpose or special-purpose computer, such as processor 1410. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 1410 to perform a certain operation or group of operations.

In some embodiments, storage device 1420 and/or memory 1430 may store data associated with an API mashup generation system (e.g., API mashup generation system 100 of FIG. 1). For example, storage device 1420 and/or memory 1430 may store APIs, API combinations, API information (e.g., keywords, parameter descriptions, endpoint descriptions, input descriptions, output descriptions, categories, clusters, sub-clusters, etc.), and/or any other data related to an API mashup generation system.

Communication device 1440 may include any device, system, component, or collection of components configured to allow or facilitate communication between computing system 1400 and another electronic device. For example, communication device 1440 may include, without limitation, a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a Wi-Fi device, a WiMAX device, cellular communication facilities, etc.), and/or the like. Communication device 1440 may permit data to be exchanged with any network such as a cellular network, a Wi-Fi network, a MAN, an optical network, etc., to name a few examples, and/or any other devices described in the present disclosure, including remote devices.

Modifications, additions, or omissions may be made to FIG. 14 without departing from the scope of the present disclosure. For example, computing system 1400 may include more or fewer elements than those illustrated and described in the present disclosure. For example, computing system 1400 may include an integrated display device such as a screen of a tablet or mobile phone or may include an external monitor, a projector, a television, or other suitable display device that may be separate from and communicatively coupled to computing system 1400.

As used herein, the terms "module" or "component" may refer to specific hardware implementations configured to perform the operations of the module or component and/or software objects or software routines that may be stored on and/or executed by, for example, API mashup generator 104. In some embodiments, the different components and modules described herein may be implemented as objects or processes that execute on a computing system (e.g., as separate threads). While some of the system and methods described herein are generally described as being implemented in software (stored on and/or executed by system 1400), specific hardware implementations or a combination of software and specific hardware implementations are also possible and contemplated. In this description, a "computing entity" may include any computing system as defined herein, or any module or combination of modules running on a computing device, such as system 1400.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of determining application program interface (API) mashups, the method comprising:
   identifying, via at least one processor, an endpoint description for a first API;
   validating, via the at least one processor, the endpoint description based on a plurality of other API endpoint descriptions, wherein validating the endpoint description includes:
      processing the endpoint description to generate a first modified endpoint description and
      changing the first modified endpoint description to generate a second modified endpoint description, wherein changing the first modified endpoint description to generate the second modified endpoint description is based on a comparison between one or more words of the first modified endpoint description and a dictionary that is based on the plurality of other API endpoint descriptions;
   determining, via the at least one processor, whether the second modified endpoint description includes at least one of input description data and output description data;
   in response to the second modified endpoint description including the input description data,
      determining, via the at least one processor, at least one possible API mashup including the first API and a second API based on a comparison of the input description data and an output description of the second API; and
   in response to the second modified endpoint description including the output description data,
      determining, via the at least one processor, one or more possible API mashups including the first API and the second API based on a comparison of the output description data and an input description of the second API.

2. The method of claim 1, wherein validating the endpoint description further includes determining that at least one of an input description and an output description of the first API is invalid for matching.

3. The method of claim 1, wherein validating the endpoint description includes:
   generating the dictionary based on the plurality of other API endpoint descriptions; and
   wherein changing the first modified endpoint description based on the comparison between one or more words of the first modified endpoint description and the dictionary includes:
      comparing the endpoint description and the first modified endpoint description to detect one or more modified words; and
      for each modified word of the one or more modified words, one of:
         validating the modified word; and
         changing the modified word back to an associated original word based on a comparison of the modified word to one or more words in the generated dictionary.

4. The method of claim 3, further comprising, for each modified word, at least one of:
   removing one or more symbols from the associated original word;
   performing a word stemming operation on the associated original word; and
   separating the associated original word into two or more words.

5. The method of claim 1, wherein determining whether the second modified endpoint description includes at least one of the input description data and the output description data comprises determining that the second modified endpoint description includes output description data based on the endpoint description including one or more pre-defined verbs.

6. The method of claim 1, wherein determining whether the second modified endpoint description includes at least one of the input description data and the output description data comprises:
   identifying, via a trained model, each word in the second modified endpoint description as a being associated with an input or an output; and
   designating each word of a training dataset as being associated with the input or the output to train the model.

7. The method of claim 1, wherein determining whether the second modified endpoint description includes at least one of the input description data and the output description data comprises:
   identifying at least one noun phrase in an input description of the first API;
   identifying one or more noun phrases in the second modified endpoint description;
   comparing the at least one noun phrase and the one or more noun phrases to identify at least one matching noun phrase;
   removing the at least one matching noun phrase from the second modified endpoint description; and
   designating the second modified endpoint description as an output description of the first API.

8. The method of claim 1, wherein validating the endpoint description further includes:
   parsing a name of an endpoint of the first API to determine a name of an input;
   parsing an input description of the first API;
   identifying one or more noun phrase chunks for the input description;
   determining a similarity score between the name of the input and each noun phrase chunk of the one or more noun phrase chunks; and
   designating the input description as invalid or valid based on the similarity score.

9. The method of claim 1, wherein validating the endpoint description further includes:
parsing a name of an endpoint of the first API to determine a name of an output;
parsing an output description of the first API;
identifying one or more noun phrase chunks for the output description;
determining a similarity score between the name of the output and each noun phrase chunk of the one or more noun phrase chunks; and
designating the output description as invalid or valid based on the similarity score.

10. The method of claim 1, further comprising:
generating a combined validated input description that includes at least one of a validated input description and an identified input portion of a validated endpoint description; and
generating a combined validated output description that includes at least one of a validated output description and an identified output portion of a validated endpoint description.

11. One or more non-transitory computer-readable media that include instructions that, in response to being executed by one or more processing systems, are configured to cause the performance of operations, the operations comprising:
identifying an endpoint description for a first API;
validating, via the one or more processing systems, the endpoint description based on a plurality of other API endpoint descriptions, wherein validating the endpoint description includes:
processing the endpoint description to generate a first modified endpoint description and
changing the first modified endpoint description to generate a second modified endpoint description, wherein changing the first modified endpoint description to generate the second modified endpoint description is based on a comparison between one or more words of the first modified endpoint description and a dictionary that is based on the plurality of other API endpoint descriptions;
determining whether the endpoint description includes at least one of input description data and output description data;
in response to the second modified endpoint description including the input description data,
determining at least one possible API mashup including the first API and a second API based on a comparison of the input description data and an output description of the second API; and
in response to the second modified endpoint description including the output description data,
determining one or more possible API mashups including the first API and the second API based on a comparison of the output description data and an input description of the second API.

12. The computer-readable media of claim 11, wherein validating the endpoint description further includes determining that at least one of an input description and an output description of the first API is invalid for matching.

13. The computer-readable media of claim 11, wherein validating the endpoint description includes:
generating the dictionary based on the plurality of other API endpoint descriptions;
wherein changing the first modified endpoint description based on the comparison between one or more words of the first modified endpoint description and the dictionary includes:
comparing the endpoint description and the first modified endpoint description to detect one or more modified words; and
for each modified word of the one or more modified words, one of:
validating the modified word: and
changing the modified word back to an associated original word based on a comparison of the modified word to one or more words in the generated dictionary.

14. The computer-readable media of claim 13, the operations further comprising at least one of:
removing one or more symbols from the associated original word;
performing a word stemming operation on the associated original word; and
separating the associated original word into two or more words.

15. The computer-readable media of claim 11, wherein determining whether the second modified endpoint description includes at least one of the input description data and the output description data comprises determining that the second modified endpoint description includes the output description data based on the endpoint description including one or more verbs.

16. The computer-readable media of claim 11, wherein determining whether the second modified endpoint description includes at least one of the input description data and the output description data comprises:
identifying, via a trained model, each word in the second modified endpoint description as a being associated with an input or an output; and
designating each word of a training dataset as being associated with the input or the output to train the model.

17. The computer-readable media of claim 11, wherein determining whether the second modified endpoint description includes at least one of the input description data and the output description data comprises:
identifying at least one noun phrase in an input description of the first API;
identifying one or more noun phrases in the second modified endpoint description;
comparing the at least one noun phrase and the one or more noun phrases to identify at least one matching noun phrase;
removing the at least one matching noun phrase from the second modified endpoint description; and
designating the second modified endpoint description as an output description of the first API.

18. The computer-readable media of claim 11, wherein validating the endpoint description further includes:
parsing a name of an endpoint of the first API to determine a name of an input;
parsing an input description of the first API;
identifying one or more noun phrase chunks for the input description;
determining a similarity score between the name of the input and each noun phrase chunk of the one or more noun phrase chunks; and
designating the input description as invalid or valid based on the similarity score.

19. The computer-readable media of claim 11, wherein validating the endpoint description further includes:
parsing a name of an endpoint of the first API to determine a name of an output;
parsing an output description of the first API;

identifying one or more noun phrase chunks for the output description;
determining a similarity score between the name of the output and each noun phrase chunk of the one or more noun phrase chunks; and
designating the output description as invalid or valid based on the similarity score.

20. The computer-readable media of claim 11, the operations further comprising:
generating a combined validated input description that includes at least one of a validated input description and an identified input portion of a validated endpoint description; and
generating a combined validated output description that includes at least one of a validated output description and an identified output portion of validated endpoint description.

* * * * *